(12) United States Patent
Boyd et al.

(10) Patent No.: US 12,547,459 B1
(45) Date of Patent: Feb. 10, 2026

(54) DATA TRANSFORMATION ALGORITHMS FOR TENSOR STREAMING PROCESSOR

(71) Applicant: Groq, Inc., Mountain View, CA (US)

(72) Inventors: Matthew Boyd, Portland, OR (US); Sahil Parmar, Mountain View, CA (US); Dennis Charles Abts, Eau Claire, WI (US)

(73) Assignee: Groq, Inc., San Jose, CA (US)

( * ) Notice: Subject to any disclaimer, the term of this patent is extended or adjusted under 35 U.S.C. 154(b) by 823 days.

(21) Appl. No.: 17/586,624

(22) Filed: Jan. 27, 2022

Related U.S. Application Data

(60) Provisional application No. 63/142,364, filed on Jan. 27, 2021.

(51) Int. Cl.
*G06F 9/50* (2006.01)
*G06F 9/4401* (2018.01)
*G06F 9/48* (2006.01)

(52) U.S. Cl.
CPC .......... *G06F 9/5027* (2013.01); *G06F 9/4405* (2013.01); *G06F 9/4881* (2013.01)

(58) Field of Classification Search
CPC ..... G06F 9/5027; G06F 9/4405; G06F 9/4881
See application file for complete search history.

(56) References Cited

U.S. PATENT DOCUMENTS

| | | | | |
|---|---|---|---|---|
| 5,568,615 A | * | 10/1996 | Sederlund | G05B 19/0421 711/149 |
| 5,655,149 A | * | 8/1997 | Muegge | H04Q 11/0407 710/10 |
| 11,694,301 B2 | * | 7/2023 | Nie | G06N 5/046 382/100 |
| 2003/0093432 A1 | * | 5/2003 | Fujita | G06F 16/287 |
| 2010/0169582 A1 | * | 7/2010 | Hinton | G06F 12/0842 711/119 |
| 2014/0288928 A1 | * | 9/2014 | Penn | G10L 15/16 704/232 |

(Continued)

OTHER PUBLICATIONS

Clauss, "Automatic Memory Layout Transformations to Optimize Spatial Locality in Parameterized Loop Nests", pp. 1-9. (Year: 2020).*

(Continued)

*Primary Examiner* — Kevin L Young
*Assistant Examiner* — Phuong N Hoang
(74) *Attorney, Agent, or Firm* — Dority & Manning, P.A.

(57) ABSTRACT

Embodiments are directed to data transformation algorithms performed at a deterministic streaming processor. Blocks of input data is streamed from a memory of the processor via a superlane of a processor to a first functional slice of the processor. The first functional slice permutes each block of input data, and each permuted block is streamed back to the memory. Permuted blocks of input data are then streamed from the memory via the superlane to a second functional slice of the processor. The second functional slice aligns portions of each permuted block to lanes within the superlane. Aligned portions of permuted blocks are then streamed to a third functional slice of the processor. The third functional slice merges the aligned portions of the permuted blocks to generate result data in a transformation domain suitable for at least one convolutional layer of the ResNet-50 model.

20 Claims, 15 Drawing Sheets

(56) References Cited

U.S. PATENT DOCUMENTS

| | | | |
|---|---|---|---|
| 2017/0177345 A1* | 6/2017 | Ould-Ahmed-Vall | ............................ G06F 9/30029 |
| 2019/0347549 A1* | 11/2019 | Phanishayee | ............ G06N 3/084 |
| 2020/0082534 A1* | 3/2020 | Nikolov | ................. G06T 7/0012 |
| 2020/0160226 A1* | 5/2020 | Ross | ...................... G06F 7/5443 |
| 2021/0034850 A1* | 2/2021 | Such | ..................... G06V 10/764 |
| 2021/0049397 A1* | 2/2021 | Chen | ........................ G06V 10/82 |
| 2021/0319542 A1* | 10/2021 | Cho | ........................... G06T 5/50 |
| 2022/0122299 A1* | 4/2022 | Levinshtein | ............. G06F 18/21 |

OTHER PUBLICATIONS

Cavalcante, M. et al., "Ara: A 1 GHZ+ Scalable and Energy-Efficient RISC-V Vector Processor with Multi-Precision Floating Point Support in 22 nm FD-SOI," arXiv:1906.00478v3, Oct. 27, 2019, pp. 1-13.

Chang, A.X.M. et al., "Compiling Deep Learning Models for Custom Hardware Accelerators," arXiv:1708.00117v2, Dec. 10, 2017, pp. 1-8.

Genc, H. et al., "Gemmini: An Agile Systolic Array Generator Enabling Systematic Evaluations of Deep-Learning Architectures," arXiv:1911.09925v1, Nov. 22, 2019, pp. 1-14.

Jouppi, N.P. et al., "In-Datacenter Performance Analysis of a Tensor Processing Unit™, " 44th International Symposium on Computer Architecture (ISCA), Toronto, Canada, Jun. 26, 2017, pp. 1-17.

Long, Y., "Energy Efficient Processing in Memory Architecture for Deep Learning Computing Acceleration," Georgia Institute of Technology, A Dissertation Presented to the Academic Faculty, Dec. 2019, pp. 1-155.

Samragh, M. et al., "CodeX: Bit-Flexible Encoding for Streaming-based FPGA Acceleration of DNNs," arXiv:1901.05582v1, Jan. 17, 2019, pp. 1-9.

Wei, X. et al., "TGPA: Tile-Grained Pipeline Architecture for Low Latency CNN Inference," ICCAD '18, Nov. 2018, pp. 1-8.

\* cited by examiner

800

Initiate, by a compiler operating on a computer, streaming of each block of input data from a memory of a processor via a superlane of the processor to a first functional slice of the processor for permuting each block of input data at the first functional slice, wherein each permuted block is streamed back to the memory
810

Initiate, by the compiler, streaming of each permuted block from the memory via the superlane to a second functional slice of the processor for aligning portions of each permuted block to lanes within the superlane, wherein the aligned portions of each permuted block are streamed to a third functional slice of the processor
820

Initiate, by the compiler at the third functional slice, merging of aligned portions of the plurality of permuted block to generate result data in a first transformation domain
830

*FIG. 8*

DATA TRANSFORMATION ALGORITHMS FOR TENSOR STREAMING PROCESSOR

CROSS-REFERENCE TO RELATED APPLICATIONS

This application claims a benefit and priority to U.S. Provisional Patent Application Ser. No. 63/142,364, filed on Jan. 27, 2021, entitled "Data Transformation Algorithm", which is hereby incorporated by reference in its entirety.

TECHNICAL FIELD

The present disclosure generally relates to data transformation processing, and more specifically to data transformation algorithms for a tensor streaming processor.

BACKGROUND

Use of computationally intensive deep learning algorithms continues to grow to solve important problems in science, transportation, security, and beyond. As workloads continue to increase both in size and complexity, serious scalability, performance, and usability challenges emerge for traditional central processing unit (CPU) and graphics processor unit (GPU) architectures. For example, hardware complexity of conventional microarchitectures makes it difficult to predict runtime stalls. In another example, while microarchitectural enhancements such as caches, branch predictors, and prefetchers help tremendously in improving performance, they do not limit worst-case performance.

By way of example, a conventional many-core processor architecture in which each processor core architecture is a processing element tied together using a network-on-chip (NoC). For example, each core can include an integer (INT) and floating-point (FP) unit as well as load-store unit (LSU) to interface with the memory hierarchy (D$ and I$) and a network (NET) interface for communication with other cores of the architecture. Unfortunately, the multi-core architecture is inadequate to handle modern workloads and machine learning models, such as the ResNet-50 model that represents a residual deep learning neural network model popular for image classification.

SUMMARY

Embodiments of the present disclosure are directed to a processor (e.g., a tensor streaming processor or an artificial intelligence processor) having a functional slice architecture. In some embodiments, the processor is configured to process a machine learning model. The processor is divided into a plurality of functional units ("tiles") organized into a plurality of functional slices. Each functional slice is configured to perform specific functions within the processor, which may include memory slices (MEMs) for storing operand data, arithmetic logic slices for performing operations on received operand data (e.g., vector processing, matrix manipulation), and/or the like. The tiles of the processor are configured to stream operand data across a first (e.g., temporal) dimension in a direction indicated in a corresponding instruction, and receive instructions across a second (e.g., spatial) dimension. The compiler for the processor is aware of the hardware configuration of the processor, and configures the timing of data and instruction flows such that corresponding data and instructions are intersected at each tile at a predetermined time. Each tile of the processor may operate on a set of data lanes in a Single Instruction Multiple Data (SIMD) manner. The set of data lanes can be referred to herein as a "superlane" and represents a cross-section of all the functional slices on a processor chip.

Embodiments of the present disclosure are directed to implementation of a data transformation algorithm on the processor. The data transformation algorithm presented herein can unpack ResNet-50 input data into the 4×4 Spatial Locality Transform (SLT) domain suitable for a first convolutional layer of the ResNet-50 model. More specifically, the data transformation algorithm presented herein, when implemented on the processor, can transform an RGB input image packed into, e.g., 320 byte vector length into a domain suitable for the 4×4 SLT stride 2 convolution.

Embodiments of the present disclosure are further directed to implementation of another data transformation algorithm on the processor related to efficient computation of the MaxPool algorithm applied on data in the 4×4 SLT domain. The MaxPool algorithm run on the processor generates results in the 2×2 SLT domain suitable for a second convolutional layer of the ResNet-50 model.

Embodiments of the present disclosure relate to a deterministic processor (e.g., tensor streaming processor) for performing data transformation algorithms. The deterministic processor includes a plurality of functional slices, a memory (e.g., static memory) coupled to the plurality of functional slices via a plurality of superlanes, and a plurality of instruction control units (ICUs) coupled to the plurality of functional slices and the static memory. The ICUs initiate streaming of each block of a plurality of blocks of input data from the memory via a superlane of the plurality of superlanes to a first of the functional slices for permuting each block of input data at the first functional slice, wherein each permuted block of a plurality of permuted blocks of input data is streamed back to the memory. The ICUs further initiate streaming of each permuted block from the memory via the superlane to a second of the functional slices for aligning portions of each permuted block to lanes within the superlane, wherein the aligned portions of each permuted block are streamed to a third of the functional slices. The ICUs then initiate, at the third functional slice, merging of aligned portions of the plurality of permuted blocks to generate result data in a first transformation domain suitable for, e.g., at least one convolutional layer of the ResNet-50 model.

Embodiments of the present disclosure further relate to a process (or method) of computing using a deterministic processor (e.g., tensor streaming processor). The process includes: initiating, by a compiler operating on a computer, streaming of each block of a plurality of blocks of input data from a memory of a processor via a superlane of a plurality of superlanes of the processor to a first functional slice of a plurality of functional slices of the processor for permuting each block of input data at the first functional slice, wherein each permuted block of a plurality of permuted blocks of input data is streamed back to the memory; initiating, by the compiler, streaming of each permuted block from the memory via the superlane to a second of the functional slices for aligning portions of each permuted block to lanes within the superlane, wherein the aligned portions of each permuted block are streamed to a third of the functional slices; and initiating, by the compiler at the third functional slice, merging of aligned portions of the plurality of permuted block to generate result data in a first transformation domain.

Embodiments of the present disclosure further relate to a non-transitory computer-readable storage medium comprising stored thereon computer executable instructions, which when executed by a compiler operating on at least one computer processor cause the at least one computer processor to: initiate streaming of each block of a plurality of blocks of input data from a memory of a processor via a superlane of a plurality of superlanes of the processor to a first functional slice of a plurality of functional slices of the processor for permuting each block of input data at the first functional slice, wherein each permuted block of a plurality of permuted blocks of input data is streamed back to the memory; initiate streaming of each permuted block from the memory via the superlane to a second of the functional slices for aligning portions of each permuted block to lanes within the superlane, wherein the aligned portions of each permuted block are streamed to a third of the functional slices; and initiate, at the third functional slice, merging of aligned portions of the plurality of permuted blocks to generate result data in a first transformation domain.

BRIEF DESCRIPTION OF THE DRAWINGS

FIG. 8 is a flowchart illustrating a method of using an integrated circuit (e.g., a TSP chip) for performing an unpack algorithm, in accordance with some embodiments.

Figure 1A:
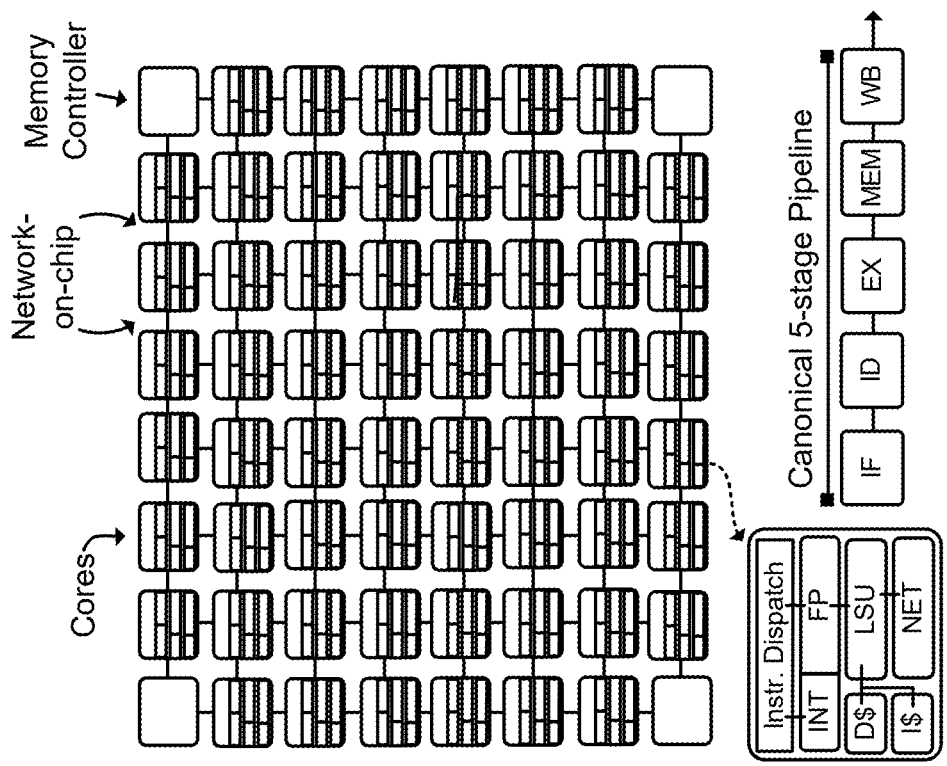
FIG. 1A illustrates a diagram of an example many-core tiled processor microarchitecture, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments are directed to a processor having a functional slicing architecture. In some embodiments, the processor may comprise a tensor streaming processor (TSP) having a functional slicing architecture, which may be used for hardware-accelerated machine learning (ML) applications.

The processor (e.g., TSP) comprises a plurality of "tiles," each tile corresponding to a functional unit within the processor. The on-chip memory and network-on-chip (NoC) of the processor architecture are fused to provide both storage of operands and results, and may act as a conduit for transferring operand and/or result data to/from the functional units of the processor. The tiles of the processor are divided between different functionalities (e.g., memory, arithmetic operation, etc.), and are organized as functional slices which operate on multidimensional data (e.g., tensors). For example, each functional slice is composed from tiles which are abutted, both horizontal and vertically, to form the functional slice. The number of tiles and computation granularity of each tile may be selected to take advantage of the underlying technology on which it is built. Taken together, the number of tiles (N) and the word granularity (M) of a memory (e.g., static random-access memory (SRAM)) yields the vector length (VL) of the machine.

In some embodiments, each functional slice of the processor functions independently, and receives instructions from an instruction control unit (ICU). The ICU may pass instructions to a first tile of the functional slice, which are then propagated in a first temporal dimension of the processor along the functional slice to the remaining tiles of the functional slice. On the other hand, data operands for storage and/or processing may be passed between different functional slices of the processor, in a second spatial dimension of the processor perpendicular to the first temporal dimension. As such, the data flow and the instruction flow of the processor are separated from each other.

In some embodiments, a compiler for the processor is aware of the hardware configuration of the processor, and synchronizes the timing of data and instruction flows such that corresponding data and instructions are received at each tile with a predetermined temporal relationship (e.g., during the same clock cycle, separated by a predetermined delay, etc.). In some embodiments, the predetermined temporal relationship may be based upon the hardware of the processor, a type of instruction, and/or the like. Because the temporal relationship between data and instructions are known by the compiler, the operand data received by a tile does not include any metadata indicating what the data is to be used for. Instead, each tile receives instructions, and based upon the predetermined timing, performs the instruction on the corresponding data. This allows for the data and instructions to flow through the processor more efficiently.

Embodiments of the present disclosure are directed to implementation of a data transformation algorithm on the processor (e.g., TSP) for unpacking input data for the ResNet-50 model and transforming the input data into the 4×4 Spatial Locality Transform (SLT) domain suitable for a first convolutional layer of the ResNet-50 model. More specifically, the data transformation algorithm presented herein, when implemented on the processor, can transform an RGB input image packed into, e.g., 320 byte vector length into a domain suitable for the 4×4 SLT stride 2 convolution.

Embodiments of the present disclosure are further directed to implementation of another data transformation algorithm on the processor (e.g., TSP) for efficient computation of the MaxPool applied on the input data in the 4×4 SLT domain. The MaxPool may generate results in the 2×2 SLT domain suitable for a second convolutional layer of the ResNet-50 model.

The ResNet-50 model represents a pretrained deep learning model for image classification of the Convolutional Neural Network (CNN, or ConvNet), which is a class of deep neural networks, mostly applied to analyzing visual imagery. The ResNet-50 model is 50 convolutional layers deep and is trained on a million images of 1000 categories from the ImageNet database. Furthermore, the ResNet-50 model has over 23 million trainable parameters, which indicates a deep architecture that makes it better for image recognition.

A TSP presented herein uses a tiled microarchitecture that allows a compiler to scale vector size to the underlying tensor shapes which they represent. Tensor computations are performed using a streaming processing model where computational elements are arranged spatially by function to take advantage of dataflow locality as tensors flow past. This novel approach enables significantly better performance than the state-of-the-art graphic processing unit (GPU), thus providing improved ResNet-50 image classification results compared to other commercially available modern GPUs and accelerators.

Architectural Overview

Figure 1B:
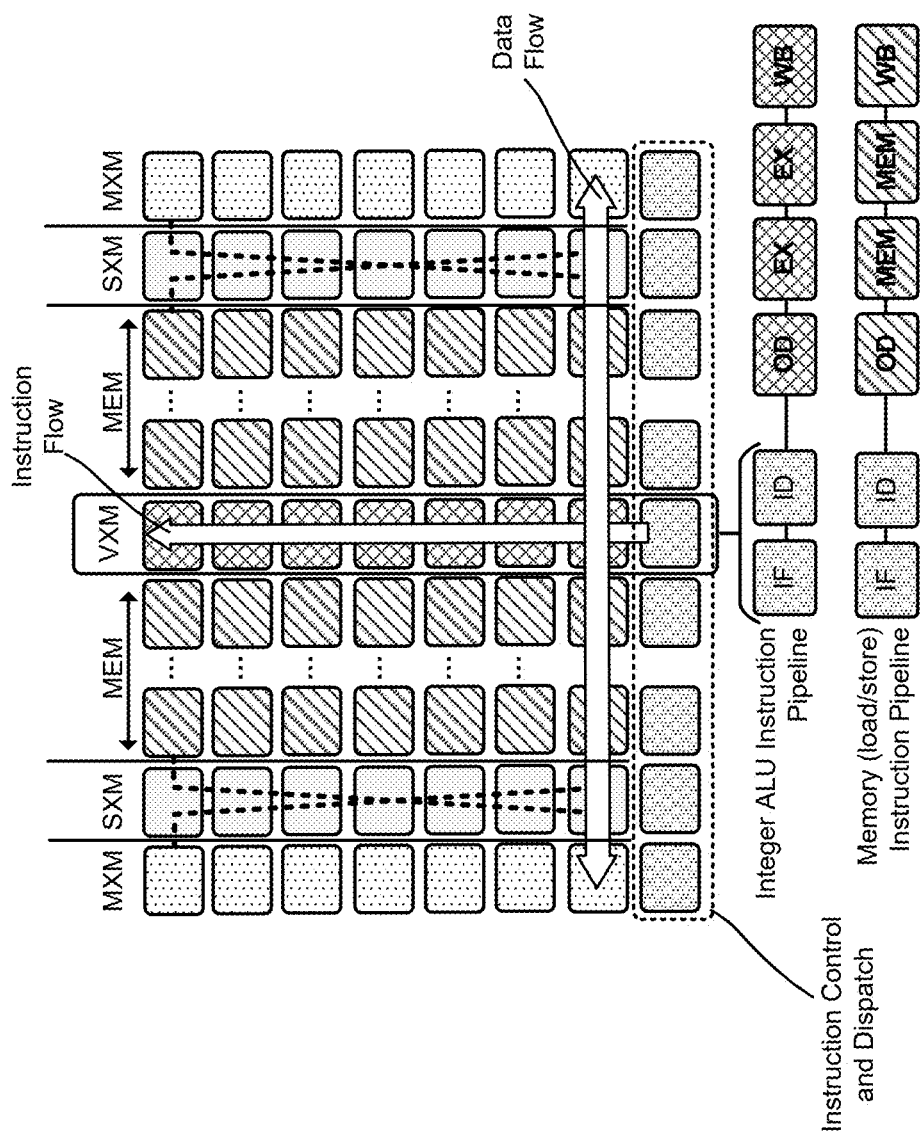
FIG. 1B shows a functionally sliced arrangement of tiles in a tensor streaming processor (TSP), in accordance with some embodiments.

In accordance with embodiments of the present disclosure, the processor plane comprises a TSP, e.g., as may be commercially available from GROQ, INC. of Mountain View, California. It is to be understood that although many embodiments described herein use a TSP as the preferred processors, other deterministic processors may be used in commercial applications. FIG. 1A shows a conventional many-core tiled processor microarchitecture. FIG. 1B shows a functionally sliced arrangement of tiles in a TSP, in accordance with some embodiments.

Certain core architectural elements set the TSP apart from GPU and accelerators. As shown in FIG. 1A, in a conventional chip multiprocessor (CMP), each "tile" is an independent core that is interconnected using the on-chip network to exchange data between cores. Instruction execution is carried out over several stages: (i) instruction fetch (IF), (ii) instruction decode (ID), (iii) execution (EX) on Arithmetic Logic Units (ALUs), (iv) memory access (MEM), and (v) writeback (WB) to update the results in the general-purpose registers (GPRs).

Figure 3:
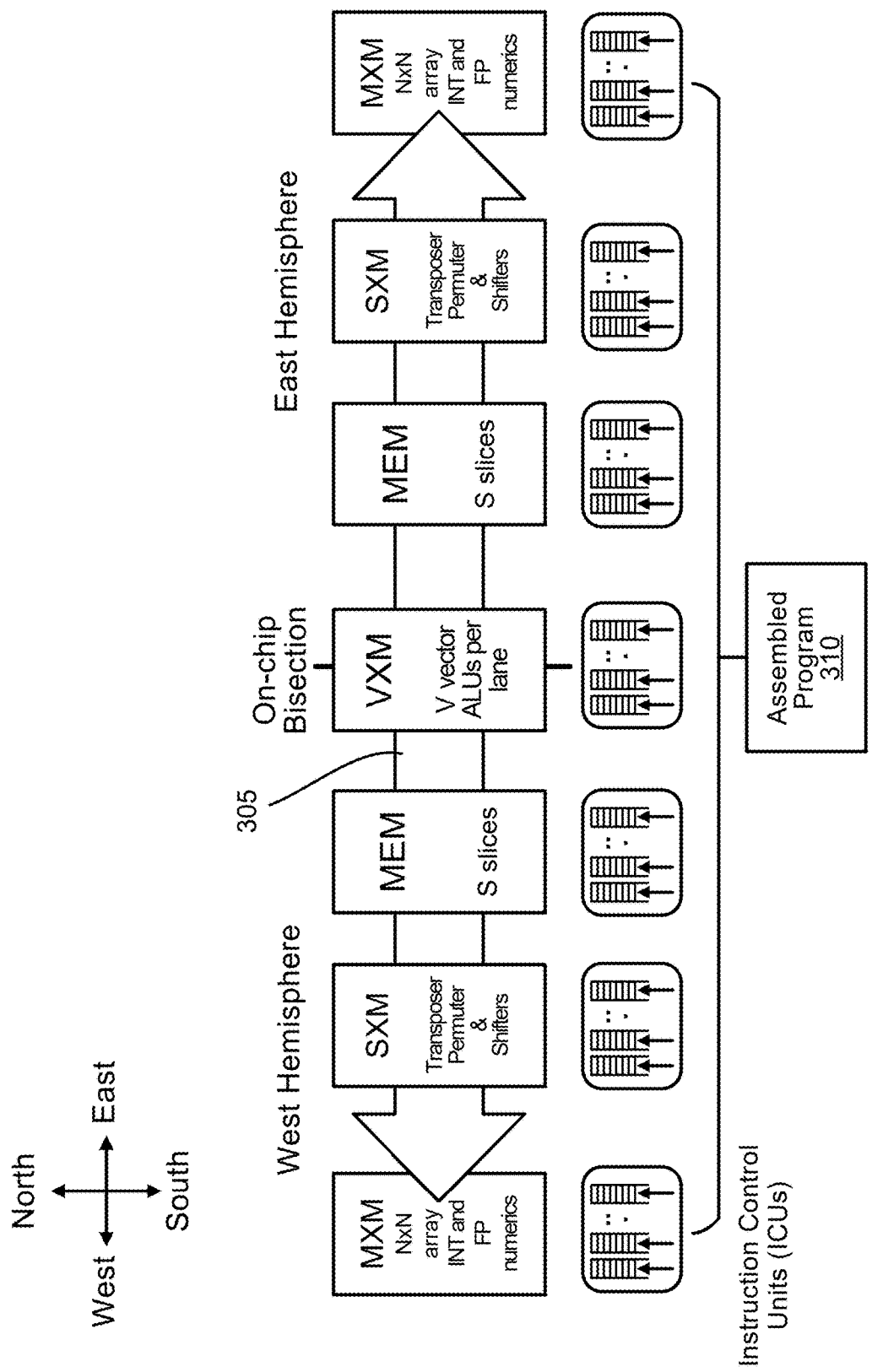
FIG. 3 illustrates organization and data flow within a row of a TSP, in accordance with some embodiments.

As shown in FIG. 1I3, in contrast from conventional multicore, where each tile is a heterogeneous collection of functional units but globally homogeneous, the TSP inverts that to have a local functional homogeneity but chip-wide (global) heterogeneity.

More specifically, the TSP reorganizes the homogeneous two-dimensional (2D) mesh of cores in FIG. 1A into the functionally sliced microarchitecture shown in FIG. 1B. In this approach, each tile implements a specific function and is stacked vertically into a specific "slice" in the Y-dimension of the 2D on-chip mesh. The TSP disaggregates the basic elements of a core in FIG. 1A per their respective functions: instruction control and dispatch (e.g., via instruction control unit (ICU)), memory (MEM), integer (INT) arithmetic, float point unit (FPU) arithmetic, and network (NET) interface, as shown by the slice labels at the top of FIG. 1B. Each row of the 2D on-chip mesh contains a cross section of all functional slices (see FIG. 3).

In this organization, each functional slice is independently controlled by a sequence of instructions specific to its on-chip role. For instance, the MEM slices support Read and Write but not, necessarily Add or Mul, which are typically performed in arithmetic functional slices (e.g., the vector execution module (VXM) and matrix execution module (MXM) slices) for some typical machine learning (ML) algorithms, such as the linear regression algorithm.

All functional slice's tiles execute the same instruction stream—Single Instruction Multiple Data (SIMD) instructions. Thus, the common instruction decode and dispatch logic can be factored out into its own tile (e.g., ICU) and decompose the normal instruction execution pipeline into two areas: (i) instruction fetch, decode, and parceling and (ii) operand read, execute, and writeback. This approach decouples the memory subsystem from the functional units retrieving their operands and depositing results.

In some embodiments, each functional slice implements a 20-stage vector pipeline that spans the tiles of each slice, with each tile producing 16 elements of the 320-element maximum vector length. This organization naturally decomposes instruction flow in the vertical dimension, and data flow in the horizontal dimension as the data flow passes over different function types. With this processor organization, instruction execution is carried out by different tiles: instruction fetching and decoding in the ICU and operand decode, execution and writeback at each tile of functional slice as the (vertical flowing) dispatched instruction intersects with the (horizontal flowing) operand data on which the dispatched instruction is operating. It will be appreciated that reference to 'vertical' and 'horizontal' or 'north', 'south', 'east' and 'west' are used in connection with the illustrations shown in the Figures, are abstractions that are solely intended to aid the reader and should not be inferred as technical limitations.

Figure 2:
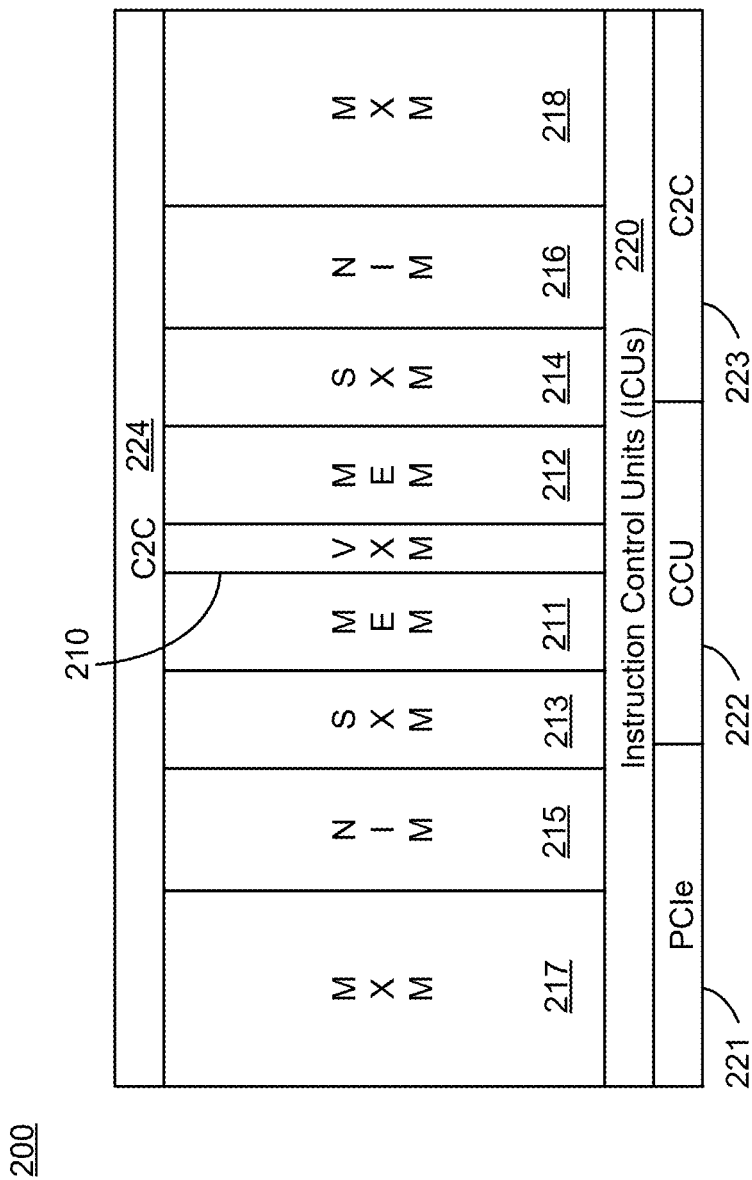
FIG. 2 illustrates an example TSP architecture, in accordance with some embodiments.

FIG. 2 illustrates an example TSP 200, in accordance with some embodiments. The TSP 200 may include memory and arithmetic units optimized for multiplying and adding input data with weight sets (e.g., trained or being trained) for machine learning applications (e.g., training or inference). For example, the TSP 200 includes a VXM 210 for performing operations on vectors (i.e., one-dimensional arrays of values). Other elements of the system are arranged symmetrically on either side of the VXM 210 to optimize processing speed. For example, the VXM 210 is adjacent to MEMs 211-212, SXMs 213-214 to control routing of data, data domain and presentation controllers (or numerical interpretation modules (NIMs)) 215-216, and MXMs 217-218. An ICU 220 controls the flow of data and execution of operations across blocks 210-218, for example. The TSP 200 may further include communications circuits such as chip-to-chip (C2C) circuits 223-224 and an external communication circuit (e.g., PCIe) 221. The TSP 200 may further include a chip control unit (CCU) 222 to control boot operations, clock resets, and other low level setup operations, for example.

FIG. 3 illustrates organization and data flow within a row of the TSP 200, in accordance with some embodiments. As shown in FIG. 3, each row of the two-dimensional on-chip mesh of the TSP 200 contains a cross section of all functional slices, i.e., N×N array of MXMs (e.g., N=320) configured for both INT and FP numerics (e.g., INT8 and FP16), S MEM slices (S=44), VXM slices with V vector ALUs per lane (e.g., V=16), and SXM slices. In this organization, each functional slice is independently controlled by a sequence of instructions specific to its on-chip role fetched by a corresponding array of ICUs (e.g., a total of I=144 ICUs). Conceptually, the functional slices are fixed and data 305 are flowing across their processing units. As the data flows through a specific functional slice, each functional slice can optionally intercept the data operands and compute a result (e.g., in case of MXM and VXM), or move data between data transport lanes on the network (e.g., in case of SXM and MEM). Instructions flow northward from the ICUs to the functional slices, while data (operands and results) primarily flow east and west between functional slices. Any inter-lane data movement within a vector uses the on-chip network slice.

It is noted that the "east-west-north-south" directionality is provided for ease of discussion, reference and understanding for explanation of processing flow as described herein and is not intended to be limited with respect to a label of a particular direction. For example, north-south could be reoriented to east-west and the principles currently described with east-west could apply to the reoriented north-south. In another example of the directionality not intended to be limited to the description per the reference noted, directionality could be referenced such that north-south is up-down and east west is right-left and the principles would accordingly apply.

In one embodiment, 320 lanes are overlaid on the TSP 200 where each tile in the on-chip mesh operates on, e.g., 16-lanes in a STMD manner. The 16-lane unit can be referred to herein as a "superlane" and represents a cross-section of all the functional slices on the chip. As such, a superlane may represent the architecture's minimum vector length (minVL) of, e.g., 16 elements. Likewise, the vertical composition of 20 tiles forming a functional slice may produce a maximum vector length (maxVL) of, e.g., 20×16=320 functional units. Each of the 144 independent on-chip ICUs can issue one or more instructions per clock cycle. The compiler has explicit control of a program order in each instruction queue, e.g., by generating an assembled program 310 for execution by the ICUs and functional slices. There are 64 logical streams per lane for moving operands or results on-chip with, e.g., 32 streams eastward and 32 streams westward. The 220 MB of globally shared SRAM may deliver 32 bytes per lane of stream bandwidth and low-latency access to model parameters. For example, MEM can read and MXM can install more than e.g., 100,000 weights into a 320×320 array (i.e., 320 lanes×320 functional units) in less than 30 clock cycles including SRAM and on-chip network transit delays.

As shown in FIG. 1B and FIG. 3, the on-chip network is implemented as X-dim mesh and Y-dim mesh of tiles with X-Y-X dimension order routing. Each instruction specifies the first hop direction (east or west), so memory instruction semantics have both an address and a dataflow direction (see FIG. 3). Streams are routed in the X-dimension through MEM and routed in the Y-dimension using the SXM's permuter and lane-shifters to move data elements vertically. The SXM's permuter implements a permutation function that is a mathematical technique that determines the number of possible arrangements in a set when the order of the arrangements matters. Common mathematical problems involve choosing only several items from a set of items with a certain order.

The MEM and the SXM provide deterministic routing of stream data as the stream data flows in the X and Y dimensions, respectively. With the TSP architecture, functional slices interact with streams of data in a producer-consumer fashion. That is, they consume operands from streams and produce results onto a (possibly different) stream, like an assembly line operator (functional slice) and conveyor belt (stream).

Conceptually, the functional slices are fixed and data is flowing across processing elements as shown in FIG. 3. As the data flows through the slice, each functional unit can optionally intercept the data operands and compute a result (if the functional unit is a processing element like an arithmetic logic unit (ALU)) or move data between lanes on the network if the functional unit is a switching element.

Streams provide a programming abstraction and are a conduit through which data flows between functional slices. Unlike GPRs, the functional slices operate on streams of parallel data flowing east or west (horizontally) across the chip. The horizontally flowing streams carrying operands intercept the vertically (northward) flowing instructions (see FIG. 3) to perform a computation at a computational unit on a functional slice. A compiler accurately maintains the chip's architectural state and uses that knowledge to ensure that instructions correctly intercept its stream operand(s).

Streams are implemented in hardware by a chip-wide streaming register file. Streams are architecturally visible and transport operands and results between slices. A common software pattern involves reading operand data from one or more MEM slices that is then subsequently consumed and operated on by a downstream arithmetic slice. The results of the operation are then produced onto another stream such that they can be written back to memory or passed to subsequent computational units. For example, a Z=X+Y operation might require four instructions: Read S1, X and Read S2, Y are executed on two MEM slices and directed inward toward an ALU slice to perform the Add S1, S2, S3. Lastly, the result is stored back to memory via a Write S3, Z. The streams represent a collection of N-elements, operated upon in a SIMD manner by each functional slice.

By way of example, a TSP architecture makes several deliberate tradeoffs on the hardware-software interface, pushing the complexities associated with scheduling into the compiler. Specifically, it falls on the compiler to precisely schedule instructions to use the hardware correctly and efficiently. At times this may involve selecting one of several means by which an algorithm or meta-operation may be realized on the hardware. Removing the control complexity of dynamic instruction scheduling for multi-issue execution units allows the ICU to be relatively small, accounting for, e.g., less than 3% of the chip area.

Figure 4:
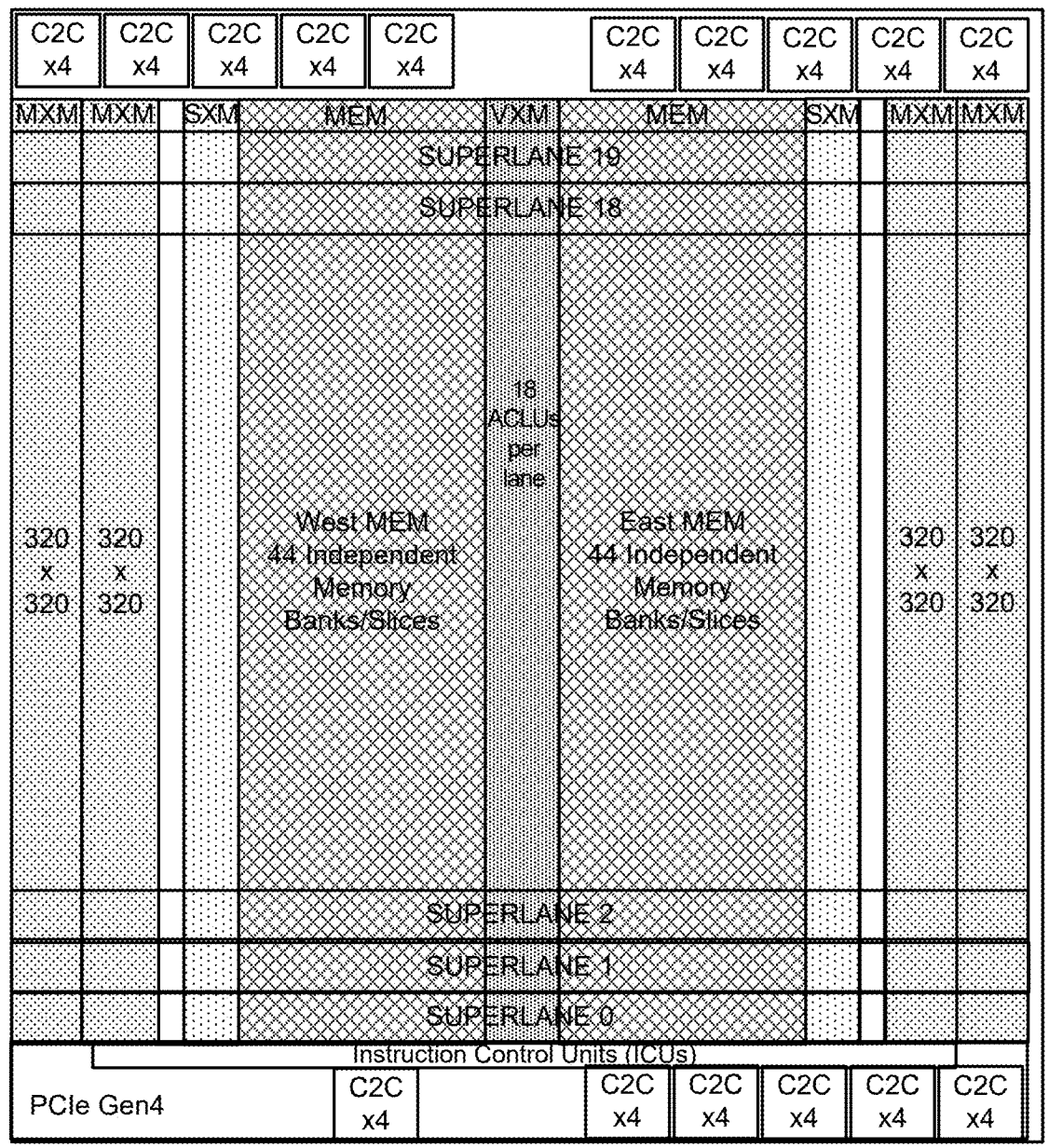
FIG. 4 illustrates a die photo of 14 nm ASIC implementation of a TSP, in accordance with some embodiments.

The compiler has access to 320-lane programming abstraction overlaid on a TSP architecture (see FIG. 4) where each tile in the on-chip mesh operates on 16-lanes in a SIMD manner. The 16-lane unit can be referred to as a "superlane" which is a cross-section of all the functional slices on the chip and the minimum granularity of computation. As such, a superlane represents the architecture's minimum vector length, minVL, of 16 elements. Likewise, the vertical composition of 20 tiles to form a functional slice (see FIG. 4) produces a maximum vector length, maxVL, of 20×16=320 elements.

The compiler has access to 144 independent instruction queues (i.e., ICUs) on-chip: (a) six for westward MXM including two independent 2D MAC (multiply-accumulate) arrays; (b) 14 for westward SXM for intra-superlane and inter-lane switching by rearranging elements of vectors; (c) 44 for westward MEM including 44 parallel memory slices of static random-access memory (SRAM); (d) 16 for VXM including 16 vector ALUs per lane; (e) 44 for eastward MEM including 44 parallel memory slices of SRAM; (f) 14 for eastward SXM; and (g) six for eastward MXM including two independent 2D MAC arrays, whereas each instruction queue can issue one or more instructions per cycle and the compiler has explicit control of the program order in each instruction queue.

Figure 5:
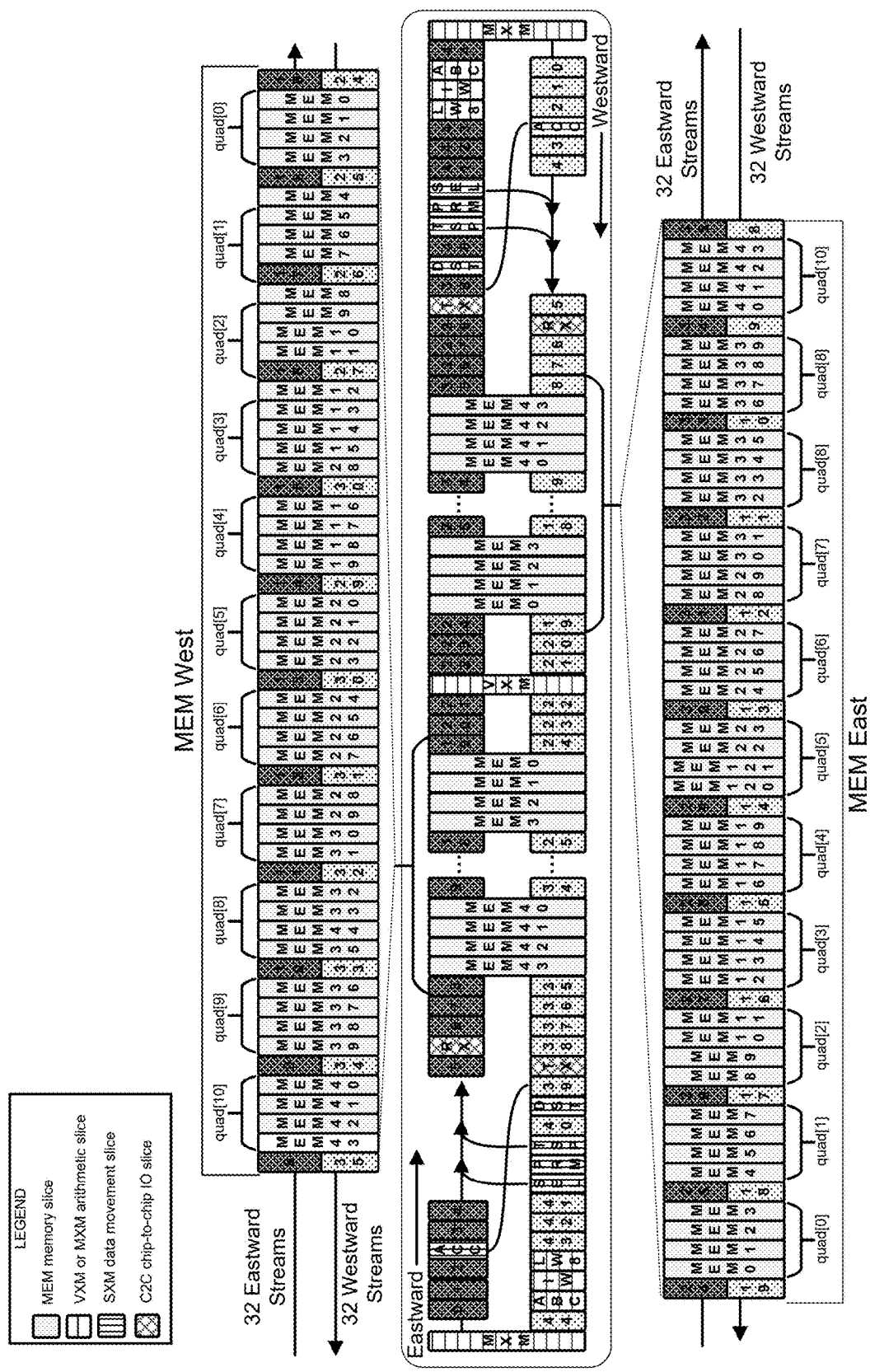
FIG. 5 depicts stream registers of a TSP that are numbered to show their locations between functional slices within a superlane, in accordance with some embodiments.

The compiler has access to 64 logical streams per lane. For example, 32 logical streams are required to operate on 16 minVL per lane for moving operands or results on-chip with 32 streams eastward, and 32 streams westward, as shown in FIG. 5.

The compiler has access to 220 MBytes of globally shared SRAM that delivers 32 bytes per lane of stream bandwidth and low-latency access to model parameters. For example, the MEM can read and MXM can install 400K weights into all four 320×320 arrays in less than 40 operational cycles including SRAM and on-chip network transit delay.

Streams are designated by both an identifier (0, . . . , 31) and direction. For example, in(28) designates stream 28 inward, and out(24) designates stream 24 toward the outward edge of the chip. The direction of a stream may be designated as inward (toward the chip bisection) or outward (toward the outward edge of the chip), or the direction may be designated as eastward or westward, as shown in FIG. 3 and FIG. 5.

The components of a superlane are organized spatially as shown in FIG. 3. The TSP's instruction set architecture (ISA) defines instructions spanning five different functional areas. The partitioned global address space (PGAS) presented by the MEM slices provides memory semantics for vectors to be addressed from SRAM and loaded into an architecturally visible stream with a direction of dataflow toward the functional slice intending to operate on them.

The first functional area (i.e., the ICU) provides explicit instruction fetching with IFetch instruction(s), and inter-slice synchronization using Sync and Notify instructions to perform chip-wide barrier synchronization among participating functional slices. A repeated-NOP (no-op) instruction allows for precise cycle-by-cycle control of inter-instruction delay. For example, the compiler has cycle-accurate control when scheduling two operations A and B using an intervening NOP so that N cycles separate them, e.g., OpA NOP(N) OpB.

The second functional area (i.e., the VXM) consists of a 4×4 mesh of ALUs in each lane for point-wise arithmetic operations.

The third functional area (i.e., the MXM) consists of four independent 2D MAC arrays that operate on, e.g., INT8 or FP16 data types.

On-chip data movement uses the fourth functional area (i.e., the SXM) for intra-superlane and inter-lane switching by rearranging elements of vectors. The SXM is analogous to the NET interface to communicate between cores in FIG. 1B. Together the MEM and SXM work in tandem to form the X-Y dimensions of the on-chip network.

The fifth functional area (i.e., the east and west hemisphere of on-chip MEM module) is composed of 44 parallel slices of SRAM and provides the memory access concurrency necessary to fully utilize the 32 streams in each East or West direction. Each slice provides 13-bits of physical addressing of 16-byte memory words, each byte maps to a lane, for a total of 220 MBytes of on-chip SRAM.

An additional sixth functional area includes Chip-to-chip (C2C) modules configured to provide Send and Receive primitives for exchanging 320-byte vectors between a pair of TSP chips. One possible TSP implementation (see FIG. 4) has, e.g., a total of 16×4 links operating at 30 Gbps each for a total off-chip bandwidth of 16×4×30 Gbps×2 directions=3.84 Tb/s (Tera-bytes per second) of off-chip pin bandwidth that can be flexibly partitioned to support high-radix interconnection networks of TSPs for large-scale systems. The host interface for peripheral component interconnect express (PCIe) Gen4 may be also handled in this module. The host interface provides a lightweight direct memory access (DMA) engine to emplace a model onto the TSP memory and provides an entry point for bootstrapping the model execution. The host interface also provides a general mechanism for passing interrupts to the host, which may be necessary in the event a multi-bit memory error is observed, for example.

Table I provides a summary of instructions for each functional slice, in accordance with some embodiments.

TABLE I

SUMMARY OF INSTRUCTIONS FOR EACH FUNCTIONAL SLICE.

| | Instruction | Description |
|---|---|---|
| ICU | NOP N | No-operation, can be repeated N times to delay by N cycles |
| | Ifetch | Fetch instructions from streams or local memory |
| | Sync | Parks at the head of the instruction dispatch queue to await barrier notification |
| | Notify | Releases the pending barrier operations causing instruction flow to resume |
| | Config | Configure low-power mode |
| | Repeat n, d | Repeat the previous instruction n times, with d cycles between iterations |
| MEM | Read a, s | Load vector at address a onto stream s |
| | Write a, s | Store stream s register contents into main memory address a |
| | Gather s, map | Indirectly read addresses pointed to by map putting onto stream s |
| | Scatter s, map | Indirectly store stream s into address in the map stream |

TABLE I-continued

SUMMARY OF INSTRUCTIONS FOR EACH FUNCTIONAL SLICE.

| | Instruction | Description |
|---|---|---|
| VXM | unary operation | z = op x point-wise operation on 1 operand, x, producing 1 result, z (e.g., mask, negate) |
| | binary operation type | z = x op y point-wise operations with 2 operands x and y producing 1 result, z (e.g., add, mul, sub) |
| | conversions | Converting fixed point to floating point, and vice versa |
| | ReLU | Rectified linear unit activation function max(0, x) |
| | TanH | Hyperbolic tangent - activation function |
| | Exp | Exponentiation $e^x$ |
| | RSqrt | Reciprocal square root |
| MXM | LW | Load weights (LW) from streams to weight buffer |
| | IW | Install weights (IW) from streams or LW buffer into the 320 × 320 array |
| | ABC | Activation buffer control (ABC) to initiate and coordinate arriving activations |
| | ACC | Accumulate (ACC) either INT32 or FP32 result from MXM |
| SXM | Shift up/down N | Lane-shift streams up/down by N lanes, and Select between North/South shifted vectors |
| | Permute map | Bijective permute 320 input $\xrightarrow{map}$ outputs |
| | Distribute map | Rearrange or replicate data within a superlane (16 lanes) |
| | Rotate stream | Rotate n × n input data to generate $n^2$ output streams with all possible rotations (n = 3 or n = 4) |
| | Transpose sg16 | Transpose 16 × 16 elements producing 16 output streams with rows and columns interchanged |
| C2C | Deskew | Manage skew across plesiochronous links |
| | Send | Send a 320-byte vector |
| | Receive | Receive a 320-byte vector, emplacing it in main memory |

A sequence of instructions performed on different functional slices can be chained to create more complex actions without the need to write back intermediate results to memory. This allows efficient processing of streams at full bandwidth and lowest latency.

Machine learning algorithms typically operate on vectors with coefficients of a specified data type (e.g., INT8, FP16, etc.). These vectors may be interpreted as an abstraction over the underlying data, whose elements can be processed by the same operation in a SIMI) manner. The TSP operates on vectors, sometimes organized into rank-2 tensors, and relies on the graph-lowering compiler to transform higher rank tensors into rank-2 tensors.

The TSP's programming model is a producer-consumer model where each functional slice acts as a consumer and a producer of one or more streams. When a vector is read from main memory, the vector is given a stream identifier (0, . . . , 31) and direction: eastward, or westward. Once the vector is read into a stream register it is a stream and is "flowing" in the given direction in the following sense: given spatially adjacent functional slices at coordinates $x_0$, $x_1$, $x_2$ (where the spatial coordinate increases in the direction of flow), then at a given time $t_i$, the vector representing stream $s_1$ at slice $x_1$ can be accessed as operands by that slice. Similarly, the slices at $x_0$ and $x_2$ will have access to different stream values for the same stream register. In the following cycle $t_{i+1}$, the value $s_1$ either propagated to the functional slice at $x_2$, or else the value $s_1$ is overwritten with a result $r_1$ produced by the slice at $x_1$ at cycle t. Similarly, the stream value $s_0$ that was present to be consumed by the functional unit at coordinate $x_0$ at time $t_i$ will be (absent $x_0$ overwriting the value at time $t_i$) available in the next cycle $t_{i+1}$ to the slice at $x_1$. Stream operands are steered toward the slice that is consuming them and producing a result stream. Streams are constantly flowing across the chip, serving as how slices communicate with one another. FIG. 5 provides a graphical depiction of the interleaving of functional units and stream registers that combine to support this programming model.

Figure 6:
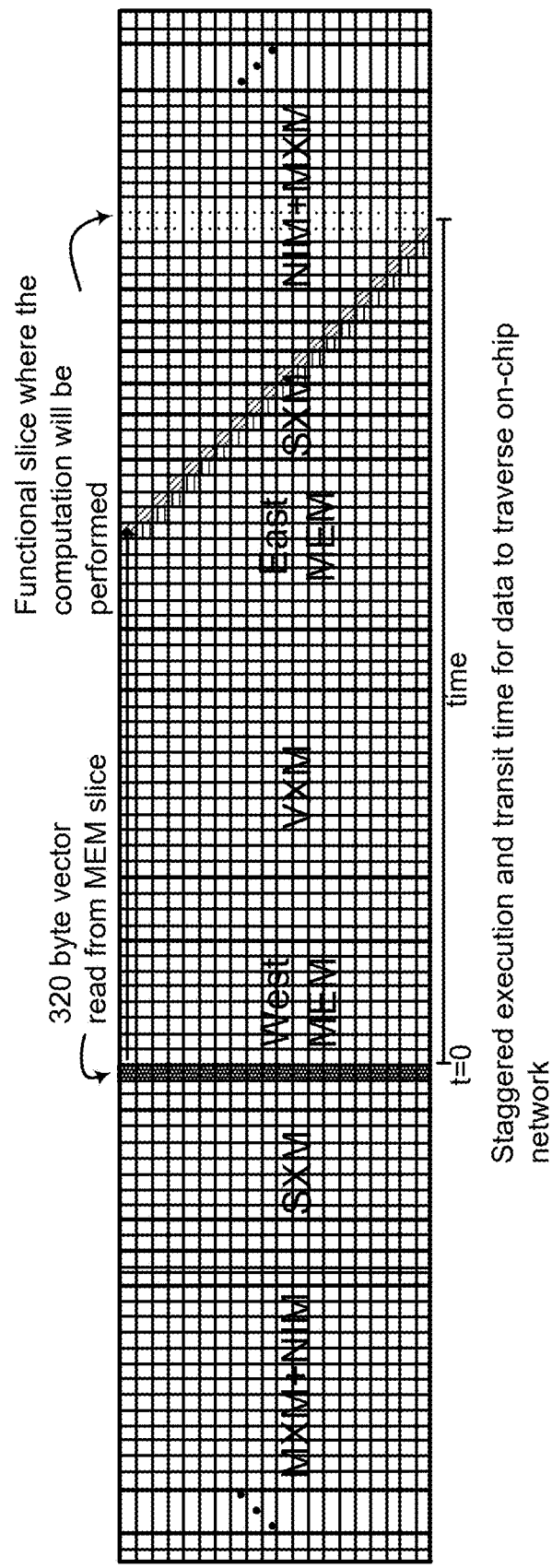
FIG. 6 illustrates a staggered instruction execution and dataflow within a superlane of a TSP, in accordance with some embodiments.

In the TSP programming model, an instruction is issued on a functional slice at a given compiler-scheduled time t and executes as a SIMD operation on stream-supplied operand vectors (e.g., of up to 320-elements), producing vectors of the same length on result streams. At the micro-architectural level, the 320-element SIMD instruction is pipelined across the vertical stack of tiles in the slice. That is, at the scheduled time t, the instruction would be issued to the bottom-most tile of the slice, e.g., corresponding to the first 16-element superlane of operand/result vectors. In the subsequent cycle, the instruction would be propagated to the next tile northward in the slice, which in turn executes the instruction on the next 16-element super lane of operand vectors. This process continues cycle-by-cycle until the process has traversed all 20 tiles in the slice. The combination of vertical instruction pipelining described above, along with the need for operands and instructions to coincide at a precise time, results in a spatial "stagger" of SIMD operand and result data as depicted in FIG. 6. As shown, a single 320-byte vector is moving eastward along a stream.

Data Transformation Algorithms

Achieving performance targets for the ResNet-50 model running on a TSP architecture may include an appropriate strategy for leveraging capabilities of the TSP architecture. To achieve a desired data throughput, SLT domains are chosen for specific convolutional layers in the ResNet-50 model. Data flow transformation algorithms are presented herein for unpacking of input data (e.g., image data) and for SLT domain translations that optimize instruction chaining, pipelining, and concurrency.

Note that a "pixel" can be referred to herein as a 1×1 coordinate in a spatial dimension specified by a height (H) value and a width (W) value. A "pixel" may refer to one or more channels in a pixel coordinate. A "half-pixel" can be referred to herein as a 1×1 coordinate in the spatial dimension referring to channels 0-5 or 6-11. Sub-channel 2 and 3 may represent the six channels in each. Sub-channel 1 may toggle between the two halves.

Unpack Algorithm

In accordance with embodiments of the present disclosure, an unpack algorithm is first applied on data (e.g., image) input into the ResNet-50 model to transform the input data into the 4×4 SLT domain suitable for a first convolutional layer of the ResNet-50 model. The input data may be provided from an external device (e.g., a host computer, a server, a portable device, etc.) to a memory of a TSP (e.g., MEMs 211-212 of the TSP in FIG. 2) via a suitable communication interface of the TSP (e.g., the PCIe 221 or the C2C circuits 223-224).

The input data may arrive at the memory of TSP in the channel last row major domain packed into, e.g., 320 byte vectors. For example, the input data may be in the form of [224, 224, 3] tensor spanning 471 vectors. The input data may be first padded for, e.g., 7×7 convolution—thus the input data shape of [224, 224, 3] may become the shape of [230, 230, 3]. After that, stride 2 for the input data may be transformed to stride 1—thus the input data shape may be transposed from [230, 230, 3] to [115, 115, 12]. Superimposing the stride 2 transform onto the input data allows the input data to be transformed into the input data shape of [112, 2, 112, 2, 3] interpreted as [row, sub-channel 1, column, sub-channel 2, subchannel 3]. Sub-channels 1, 2 and 3 may be the results of transforming a 2×2 pixel three-channel slice into a 1×1 pixel 12-channel slice, which converts a stride 2 convolution into a stride 1 convolution. The first row/sub-channel 1 of the input data may iterate through channels 0-5 for 112 half-pixels (sub-channels 2 and 3). The second row/sub-channel 1 may iterate through channels 6-11 for 112 half-pixels. That pattern repeats across the input data as the row dimension is increased resulting in the input data shape of [115, 115, 12]. The input data may be then padded for the 4×4 kernel so that the input data shape of [115, 115, 12] may become the input data shape of [116, 116, 12] in the 4×4 SLT domain ready for the first convolution layer of the ResNet-50 model.

The unpack algorithm efficiently transforms input data (e.g., image) into a data layout suitable for streaming through a convolution operation. The unpack algorithm may transform input data (e.g., image data) packed contiguously across multiple vectors stored in SRAM of a TSP (e.g., MEMs 211-212 of the TSP 200) into a tiled and aligned data domain. The unpack algorithm may be composed of three stages. The first stage may include moving channel data to an appropriate super lane of the TSP. The second stage may include aligning channel data within the super lane to an appropriate lane of the TSP. The third stage may include aligning channel data "horizontally" into an appropriate address/vector. Each stage of the unpack algorithm may take advantage of SRAM concurrency and addressability, streaming throughput, and instruction pipelining to achieve a high performance implementation.

In some embodiments, the unpack algorithm includes the pre-stage (i.e., stage 0) that represents an input copy stage. For example, an input-output (IO) controller of the TSP may make two copies of the input data on different slices of SRAM (e.g., on MEM 211 and MEM 212) for enabling two concurrent permute operations in the first stage of the unpack algorithm. As used herein, the reference to "slice" refers to a memory slice within a selected super lane.

During the first stage of the unpack algorithm, channel data may be moved to an appropriate super lane of the TSP. Channel data may be selected from SRAM using a gather operation and gather address map to concurrently load individually addressable blocks of, e.g., 16 bytes of data onto a stream and send the data to a permuter functional unit (e.g., SXM 213 or SXM 214). A permute map may be defined in coordination with the gather map to select channel data that has mutually exclusive alignment between super lanes, which may enable high utilization of the permute operation. The permuted data may be streamed back to SRAM and stored using the scatter operation and a scatter map to concurrently store individually addressable blocks of, e.g., 16 bytes of data.

The first stage of the unpack algorithm may be referred to as a "permute to channel super lanes" stage. During the first stage of the unpack algorithm, data comprising, e.g., two sets of 96 bytes composed of 16 bytes in each channel 0-11 may be gathered. The gathered data may be transformed from, e.g., 471 packed vectors (with 128 byte padding in the last vector) into 784 vectors with 192 bytes each. Note that the 192 bytes may be composed of 96 bytes of channels 0-5 from 16 consecutive pixels from one row and 96 bytes of channels 6-11 from 16 consecutive pixels from a different row. Channel bytes may be permuted into their respective super lanes, e.g., channel 0 may align with SL0 (super lane 0), channel 1 may align with SL1, etc. Vectors containing bytes that make up a given tile may be extracted. The extracted bytes may be aligned into their correct position in the respective super lane, wherein the extracted bytes may originate from different vectors. The vectors may be merged into a single vector per SLT tile. The output result may be generated in the form of 784 vectors, which may be written across, e.g., four MEM slices to enable concurrency in the second stage of the unpack algorithm.

Thus, the first stage of the unpack algorithm can be divided into three steps: (a) the gather step, (b) the permute step, and (c) the store step. At the gather step of the first stage of the unpack algorithm, 96 byte sub-vectors may be selected each containing 16 bytes of half of the 12 input channels, where one set of sub-vectors contains channels 0-5 and the other set of sub-vectors contains channels 6-11. Note that the two sets may not be spatially related in the input data. The two sets may originate from a convenient location in the input data that does not overlap the super lanes between them. Each gather may repeat every 21 input vectors, i.e., approximately 22 times across the 471 packed input vectors.

At the permute step of the first stage of the unpack algorithm, each gathered vector may be streamed through a permuter configured with a specific permute map. Gathered vectors may be ordered to minimize permuter map changes. The permute map may be reused on the permute instruction to reduce steam contention in the third stage of the unpack algorithm. In one or more embodiments, ten permute maps and ten gather patterns may be required.

At the store step of the first stage of the unpack algorithm, each permuted vector may be stored to, e.g., four MEM slices to enable concurrency in the second stage of the unpack algorithm. Two MEM slices spatially close to each side may be selected to reduce latency in the second stage of the unpack algorithm and reduce stream contention across a VXM (e.g., the VXM 210) for the third stage of the unpack algorithm. Permute results may be addressed based on an order in the permute map.

During the second stage of the unpack algorithm, channel data may be aligned within a super lane to an appropriate lane of the TSP. Channel data may be again selected from SRAM (e.g., MEM 211 and/or MEM 212) using a gather operation and gather address maps. For example, blocks of 16 bytes of data may be selected and streamed to a distributor to select and align bytes to lanes within the super lane. Lanes that would be populated with data from other vectors in the third stage of the unpack algorithm may be set to zero. Multiple gather instructions may concurrently stream data to distributors for high throughput processing. Combinations of distributor maps may produce data with the lane exclusive alignment. Distributor results may be then streamed to the VXM to combine vectors during the third stage of the unpack algorithm.

During the second stage of the unpack algorithm, bytes of data may be distributed into their SLT lane position and bytes that belong to a different SLT tile may be zeroed. For example, there may be 20 distributor maps to extract and align four rows of data across four SLT tiles. Three SLT tiles may be composed of results from, e.g., four vector distributor maps. One SLT tile may be composed of results from, e.g., eight vector distributor maps. Due to zero padding, the left and right edge tiles may utilize four distributor maps, and the top and bottom tiles may utilize two distributor maps. Four distributors may be available while the first stage of the unpack algorithm is still processing the input data. Each distributor may have a bandwidth to process, e.g., eight INT8 vectors concurrently.

The second stage of the unpack algorithm may be referred to as a "distribute to SLT lanes" stage. During a gather step of the second stage of the unpack algorithm, both channel sets for, e.g., 16 pixels may be gathered and distributed between two and four pixels per 12 channels into each byte's SLT positions. During the gather step of the second stage of the unpack algorithm, 192 byte vectors of all 12 channels of 16 contiguous pixels may be gathered. Furthermore, during the gather step of the second stage of the unpack algorithm, all 12 channels across 16 consecutive pixels may also be merged into a corresponding vector. Each vector may contain bytes from, e.g., five SLT tiles. The combination of padding for 7×7 convolution and 4×4 SLT domain may result in a two-pixel padding. The contiguous 16 pixels in the input data may be aligned with two pixels in the first SLT tile and two pixels in the fifth SLT tile with four pixels in the second, third, and fourth SLT tiles.

With all 12 channels of each pixel being merged, bytes of data may be aligned into a proper position for a SLT tile, during a distribute step of the second stage of the unpack algorithm following the gather step of the second stage. The distributor map may repeat the same 16 byte pattern across each super lane. Pixels that are not part of a target SLT tile may be zeroed. Between four and eight vectors may be required to build an SLT tile, and between two and four vectors may be required at data edges (e.g., edges of image) due to zero padding. A total of, e.g., 20 distributor maps may be required to align pixels to their appropriate positions.

Each gather map may be used, e.g., five times—one for each SLT tile for which the gathered vector contains pixels. The VXM may have a bandwidth to merge four vectors concurrently in each pipeline and enough ALUs for ample pipelines. A latency of the second stage of the unpack algorithm may be hidden behind a latency of the first stage of the unpack algorithm because of the pipelining.

During the third stage of the unpack algorithm, channel data may be aligned into an appropriate address/vector, and vectors may be merged. The distributor aligned lane exclusive data may arrive at the VXM. Multiple inputs may be OR'ed together (i.e., merged) to produce the result data in the target transformation domain.

During the third stage of the unpack algorithm, the results of the distributor maps may be merged in the VXM. For example, a three-OR tree may merge four vectors into one vector for the three-fourth of the SLT tiles. Additionally, a seven-OR tree may merge eight vectors into one vector for the one-fourth of the SLT tiles (minus edges that require between two and four vectors).

The third stage of the unpack algorithm may be referred to as a "merge to SLT vectors" stage. During the third stage of the unpack algorithm, between four and eight vectors passed through one or more distributors may be merged at the VXM, thus enabling a higher throughput at the one or more distributors. For example, two "OR" pipelines (or trees) may be utilized to merge sets of four input vectors. Any output vectors requiring eight input vectors may pass through two pipelines and be merged with an additional "OR" pipeline (or tree). The output of the merge vectors may represent the input vectors transformed into the 4×4 SLT domain.

The vector bookkeeping steps backwards from the target SLT tile through the maps and vector coordinates of each stage of the unpack algorithm. SLT tiles may be indexed starting at index 0. The pattern of distributor maps that applies to SLT tiles may repeat every four SLT tiles along a row and is consistent within a column. Thus, the following may hold:

$$\text{Tile\_column mod } 4 = \begin{cases} 0 & \text{then } A \text{ and } E \\ 1 & \text{then } B \\ 2 & \text{then } C \\ 3 & \text{then } D \end{cases} \quad \text{Eq. (1)}$$

where A, B, C, D and E are corresponding distributor maps. According to Eq. (1), SLT tiles at edges may use parts of the distributor maps, e.g., the left edge uses only the distributor map E.

Each SLT tile may be composed of bytes coming from two, four, or eight vectors. Coordinates of the input vector (e.g., each composed of 16 contiguous pixels from an image row across all channels) may be defined by the SLT tile's row and column [r, c] as: rows=[r*4−2:r*4+1], columns=max{floor(c)−14, 0}: floor(c4), where vectors are indexed starting at index 0. Distributor maps with vectors may determine source vectors based on a segment index and gather maps. The gather map index for each row and column [r, c] may be determined as floor(r8*28)+c*4+r*mod 4. The order in which inputs are processed may need to be prioritized to maximize pipelining across stages of the unpack algorithm and to reduce overall latency balanced with reducing instruction delay from changing permute maps and distributor maps.

Max-Pool Algorithm

Embodiments of the present disclosure are further directed to a data transformation algorithm for computation of the 3×3 MaxPool with stride 2 applied on the result of the first convolutional layer of the ResNet-50 model. MaxPool, maximum pooling, or max pooling, is a pooling operation that calculates the maximum, or largest, value in each patch of a feature map (e.g., an image), thus reducing the size of the feature map. For the 3×3 MaxPool, the size of each patch is 3×3. The data transformation algorithm presented herein for computation of the 3×3 MaxPool at a TSP may transform data input into the 3×3 MaxPool from the 4×4 SLT domain into an intermediate domain (e.g., strided format) and then into a final SLT domain (e.g., sparse 2×2 SLT domain). The data transformation algorithm for computation of the 3×3 MaxPool may include three major stages: (i) input data transformation; (ii) pooling operation; and (iii) output data transformation.

Data input into the 3×3 MaxPool later may arrive from the first convolutional layer of the ResNet-50 model in the 4×4 SLT domain shaped as, e.g., [28, 28, 4, 4, 64] tensor. The input data may be then reshaped and transposed into a [112, 112, 64] tensor suitable for the 3×3 MaxPool algorithm. Transformation of the input data may be performed by transposing the input data across each super lane. The input data may be max pooled and output in the sparse 2×2 SLT domain to be provided as an input into the second convolutional layer of the ResNet-50 model.

Figure 7A:
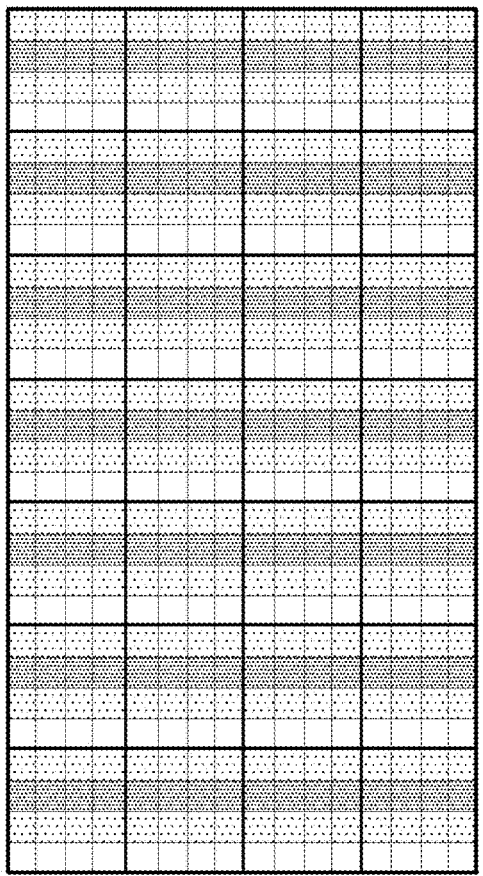
FIGS. 7A through 7F illustrate example decomposed steps of the MaxPool algorithm implemented at a TSP, in accordance with some embodiments.
Figure 7B:
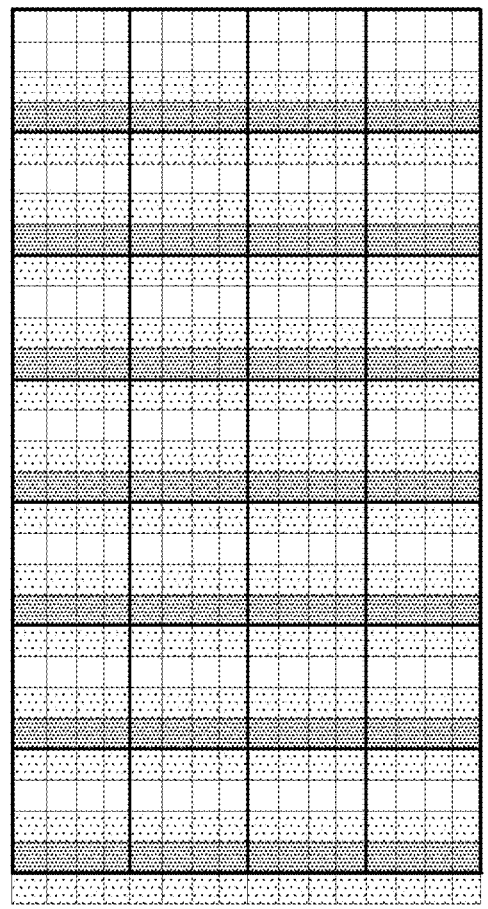

The algorithm for computation of the 3×3 MaxPool for transforming the 4×4 SLT domain input into the sparse 2×2 SLT domain output can be summarized as follows. The input data in the 4×4 SLT domain may be first transposed. For example, sets of 16 horizontally adjacent SLT vectors may be transposed across each super lane. The transpose may make each pixel in an SLT tile addressable in MEM. The same pixel position from 16 horizontally adjacent SLT tiles may be aligned in a vector. The value from each tile may occupy the same lane and channels may be spread across super lanes. Then, max pooling of all 1×3 patches (i.e., 1×3 MaxPool) completely contained in an SLT tile may be computed. FIG. 7A illustrates an example result of the 1×3 MaxPool within SLT tiles, in accordance with some embodiments. Following this step, vectors may be distributed and transposed to shift north within the super lane. The distribution and transposition may align pixels across SLT tiles into the same lane. After that, max pooling of all 1×3 patches (i.e., 1×3 MaxPool) that span tiles may be computed. FIG. 7B illustrates an example result of the 1×3 MaxPool across SLT tiles, in accordance with some embodiments. Non-shaded (i.e., blank or white) squares in FIGS. 7A-7B represent zeroes.

Figure 7C:
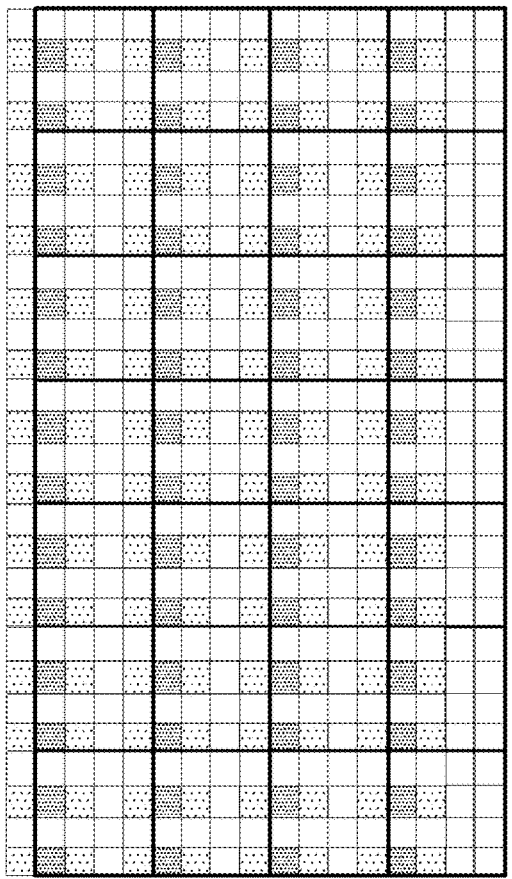
Figure 7D:
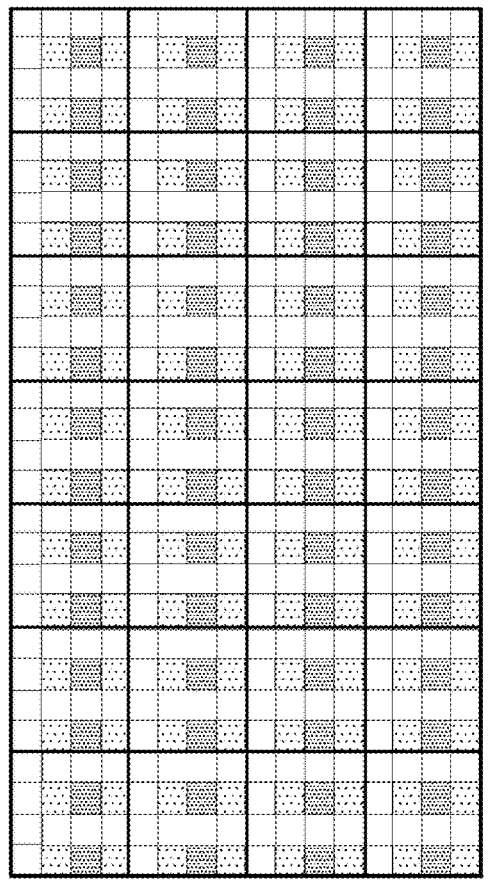
Figure 7E:
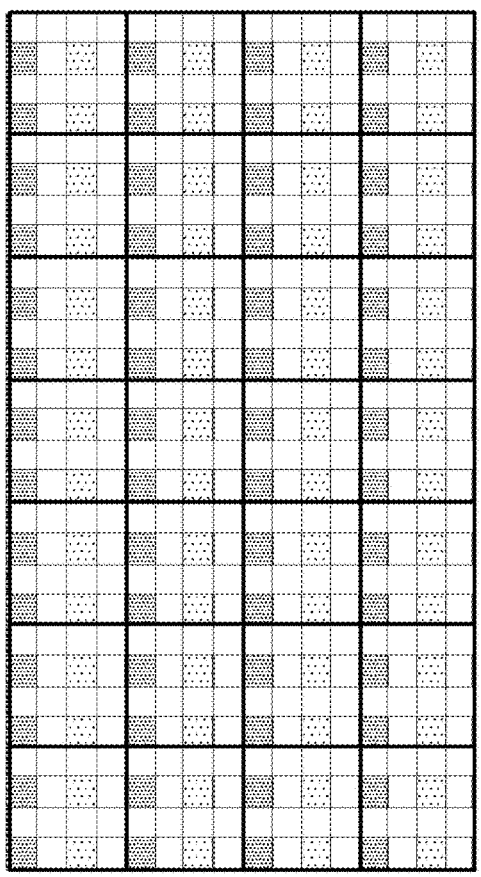

Next, 3×1 MaxPool may be computed, i.e., max pooling of all 3×1 patches may be computed, the result of which may represent final activations of the 3×3 MaxPool. FIG. 7C illustrates an example result of a first part of the 3×1 MaxPool, in accordance with some embodiments. FIG. 7D illustrates an example of the results of a second part of the 3×1 MaxPool, in accordance with some embodiments. FIG. 7E illustrates an example of final activations of the 3×3 MaxPool, in accordance with some embodiments. Non-shaded (i.e., blank or white) squares in FIGS. 7C-7E represent zeroes.

Figure 7F:
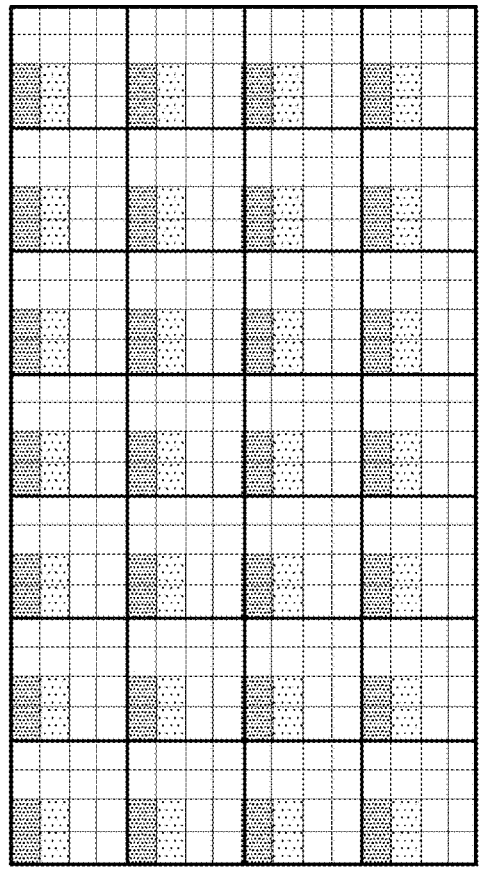

The computed final activations of FIG. 7E may be transposed into spatially addressable format, i.e., each vector may be transposed with zeros to make values addressable. In some embodiments, the computed final activations (e.g., four vectors of final activations) are transposed into the sparse 2×2 SLT domain. FIG. 7F illustrates an example of the computed final activations transposed into the sparse 2×2 SLT domain, in accordance with some embodiments. Non-shaded (i.e., blank or white) squares in FIG. 7F represent zeroes.

The input data transformation may be an initial stage of the MaxPool algorithm during which input data may be transposed to leverage the vector address granularity and concurrency in SRAM. The input data may be transposed from the 4×4 SLT domain into a strided domain to enable each spatial position from the tiled domain to be individually addressable in SRAM. The transposed data may be written to SRAM partitioned to both hemispheres to enable high stream initialization into and out of the VXM.

To reduce the number of Max operations in the VXM, the 3×3 MaxPool is decomposed into the 1×3 MaxPool operation followed by the 3×1 MaxPool operation. For example, the input tensor of size [112, 112, 64] may be reduced to the tensor of size [56, 56, 64]. However, the input data may be in the 4×4 SLT domain. In this format, each SLT tile may be an addressable vector containing the 4×4 patch of pixels of the tile. Each super lane may contain one channel of data. Data is concurrently read from SRAM and streamed to VXM ALUs for the 1×3 MaxPool. The 1×3 MaxPool leverages the lane alignment of data for achieving a preferred throughput. The spatial coordinates of MaxPool striding may require data aligned on adjacent lanes to be realigned for computation. The distributor may be used to realign a copy of a vector to compute sections of the MaxPool that span the original 4×4 tiles. After that, the 3×1 MaxPools may be computed. All of the strides may be individually addressable in such a case and the distribute operation may not be required.

The pooling operation may utilize the VXM Max operation which requires values to be in the same lane. For example, 16 horizontally adjacent SLT vectors may be transposed to align the per channel bytes into the same lane. Each adjacent SLT tile's bytes may occupy the next lane across the super lane. The pattern may repeat for each channel across super lanes. With 16 spatial bytes aligned in the same lane, some of the 1×3 MaxPool operations may be performed. Any 1×3 patch that is within an SLT tile may be computed. Since SLT tiles can be stacked across a super lane, 16 MaxPool operations may be computed concurrently. The MaxPool patches that span SLT tiles may not be aligned, e.g., between tiles 0 and 1 there may be one value in lane 0 and two values in lane 1. The distributor may be employed to shift, e.g., 15 bytes up one lane. Multiple concurrent MaxPools (e.g., 15 at a time) may be computed for patches overlapping two SLT tiles.

The two Max operations required to compute a 1×3 MaxPool can be chained. Two vectors may stream to the VXM on operational cycle 0 for the first Max operation, and one vector may stream to the VXM on operational cycle 1 to meet up for the second Max operation, thus occupying three separate stream groups. The first Max operation and the second Max operation may be pipelined across multiple pipeline stages of the VXM. Max operations may extensively utilize one or more relatively large ALUs available at the VXM. For example, four pipeline stages may be available across the VXM with two ALUs per pipeline. Each pipeline stage may require, e.g., 12 input streams and four output streams.

The last stage of the MaxPool algorithm may involve an output data transformation. During the last stage of the MaxPool algorithm, output data in the strided domain may be transformed back into the SLT domain, such as the sparse 2×2 SLT domain.

Example Process Flows

FIG. 8 is a flowchart illustrating a method 800 of using an integrated circuit (e.g., TSP chip) for performing an unpack algorithm, in accordance with some embodiments. The integrated circuit can further include at least one computer processor (e.g., a deterministic streaming processor) and a non-transitory computer-readable storage medium for storing computer executable instructions. The deterministic streaming processor may be a TSP. The operations of method 800 may be initiated by a compiler operating on at least one computer processor and/or on a host server separate from the integrated circuit. The compiler may utilize as its input a model (e.g., a machine learning model) for the deterministic streaming processor and outputs instructions for configuring operation of the deterministic streaming processor and the integrated circuit as a whole.

The integrated circuit initiates 830 streaming of each block of a plurality of blocks of input data from a memory (e.g., static memory or SRAM) of the deterministic streaming processor via a superlane of a plurality of superlanes of the deterministic streaming processor to a first functional slice of a plurality of functional slices of the deterministic streaming processor for permuting each block of input data at the first functional slice, wherein each permuted block of a plurality of permuted blocks of input data is streamed back to the memory. The integrated circuit may initiate streaming of each block of input data from the memory by initiating a plurality of gather operations associated with a gather address map to concurrently load the plurality of blocks onto the superlane for concurrently sending the plurality of blocks to the first functional slice. The integrated circuit may further initiate, at the first functional slice, a permute operation of each block in accordance with a permute map defined in coordination with the gather address map. The integrated circuit may further initiate concurrent storing of each permuted block into the memory by initiating a plurality of scatter operations associated with a scatter address map.

The integrated circuit initiates 820 streaming of each permuted block from the memory via the superlane to a second of the functional slices for aligning portions of each permuted block to lanes within the superlane, wherein the aligned portions of each permuted block are streamed to a third of the functional slices. The integrated circuit may initiate streaming of each permuted block from the memory by initiating a plurality of gather operations of the deterministic streaming processor associated with one or more gather address maps to concurrently load the plurality of permuted blocks onto the superlane for concurrently sending the plurality of permuted block to the second functional slice. The integrated circuit may initiate, at the second functional slice, selecting and aligning the portions of each permuted block to the lanes within the superlane. The integrated circuit initiates 830, at the third functional slice, merging aligned portions of the plurality of permuted blocks to generate result data in a first transformation domain (e.g., 4×4 SLT domain). The integrated circuit may initiate streaming the aligned portions of each permuted block to the third functional slice comprising a VXM. The integrated circuit may further initiate performing logical OR operations at the VXM to merge different aligned portions of the permuted blocks into the result data of the first transformation domain.

Figure 9:
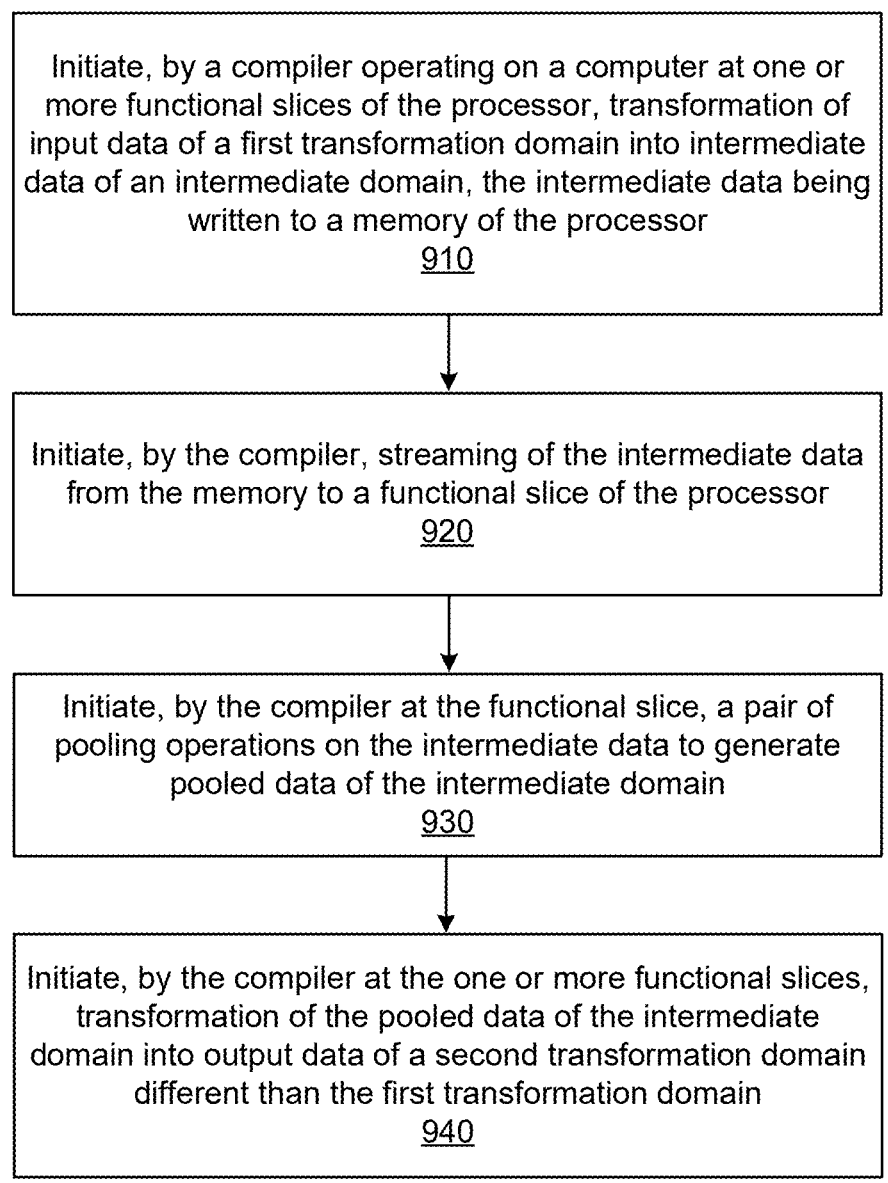
FIG. 9 is a flowchart illustrating a method of using an integrated circuit (e.g., a TSP chip) for performing the MaxPool algorithm, in accordance with some embodiments.

FIG. 9 is a flowchart illustrating a method 900 of using an integrated circuit (e.g., TSP chip) for performing the MaxPool algorithm, in accordance with some embodiments. The integrated circuit can further include at least one computer processor (e.g., a deterministic streaming processor) and a non-transitory computer-readable storage medium for storing computer executable instructions. The deterministic streaming processor may be a TSP. The operations of method 900 may be initiated by a compiler operating on at least one computer processor and/or on a host server separate from the integrated circuit. The compiler may utilize as its input a model (e.g., a machine learning model) for the deterministic streaming processor and outputs instructions for configuring operation of the deterministic streaming processor and the integrated circuit as a whole.

The integrated circuit initiates 910, at one or more functional slices of a plurality of functional slices of the deterministic streaming processor, transformation of input data of a first transformation domain (e.g., the result data generated at the step 830) into intermediate data of an intermediate domain, the intermediate data being written back to a memory (e.g., static memory or SRAM) of the deterministic streaming processor. The intermediate data may be written into a pair of hemispheres of the memory (e.g., east and west hemispheres of MEMs).

The integrated circuit initiates 920 streaming of the intermediate data from the memory to a functional slice (e.g., VXM) of the plurality of functional slices. The integrated circuit initiates 930, at the functional slice, a pair of pooling operations applied on the intermediate data to generate pooled data of the intermediate domain. The integrated circuit may initiate, at the functional slice, the pair of pooling operations by initiating a 1×3 MaxPool operation followed by a 3×1 MaxPool operation.

The integrated circuit initiates 940, at the one or more functional slices, transformation of the pooled data of the intermediate domain into output data of a second transformation domain different from the first transformation domain. The first transformation domain may be the 4×4 SLT domain, the intermediate domain may be the strided format, and the second transformation domain may be the sparse 2×2 SLT domain.

Example Computer System Architecture

Figure 10A:
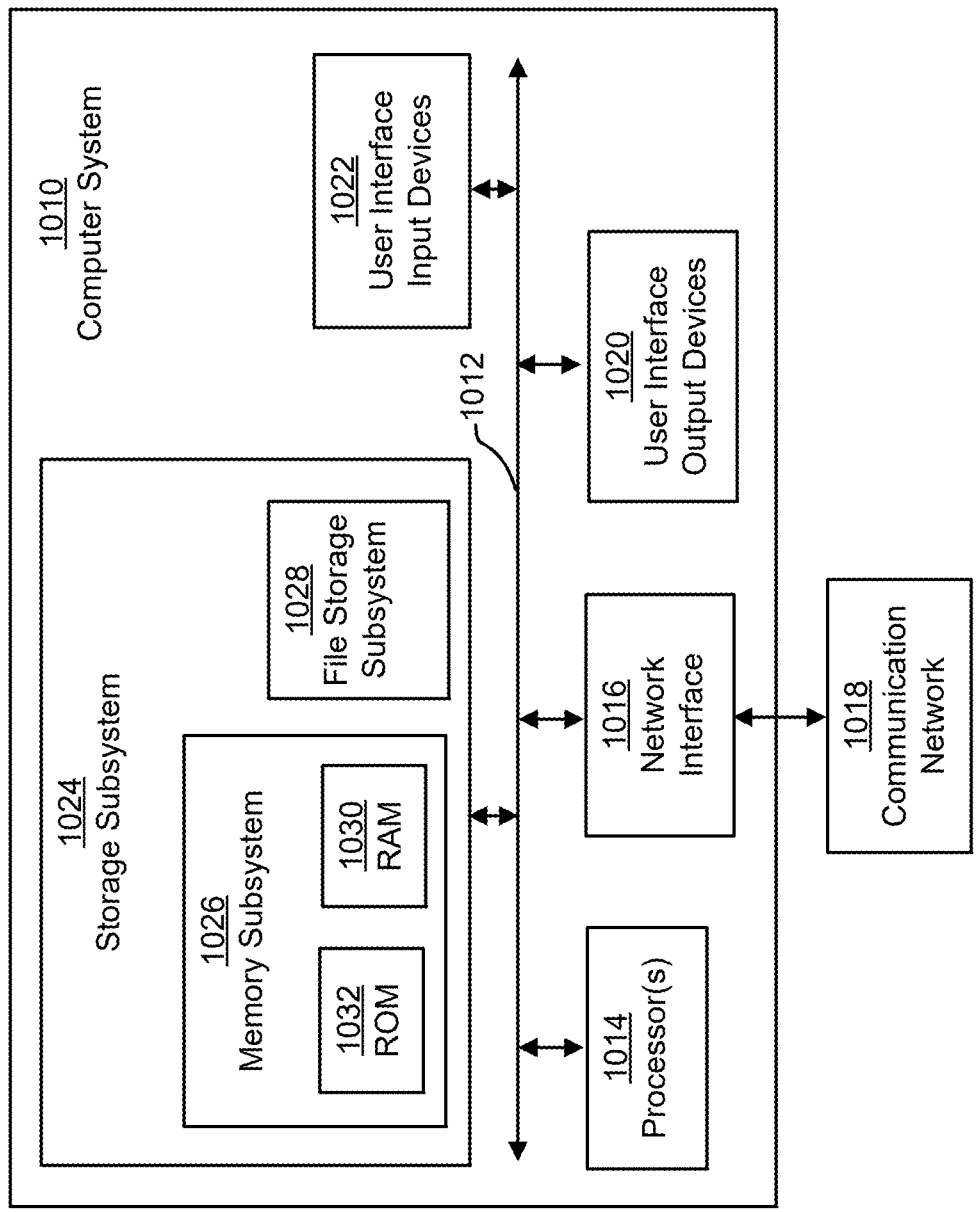
FIG. 10A is an abstract diagram of an example computer system suitable for enabling embodiments of the claimed disclosures for use in commerce, in accordance with some embodiments.

FIG. 10A is an abstract diagram of an example computer system suitable for enabling embodiments of the claimed disclosures, in accordance with some embodiments.

In FIG. 10A, the structure of computer system 1010 typically includes at least one computer 1014 which communicates with peripheral devices via bus subsystem 1012. Typically, the computer includes a processor (e.g., a microprocessor, graphics processing unit, or digital signal processor), or its electronic processing equivalents, such as an ASIC or FPGA. Typically, peripheral devices include a storage subsystem 1024, comprising a memory subsystem 1026 and a file storage subsystem 1028, user interface input devices 1022, user interface output devices 1020, and/or a network interface subsystem 1016. The input and output devices enable direct and remote user interaction with computer system 1010. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine with instructions that specify actions to be taken by that machine. The term 'server', as used herein, refers to a computer or processor that typically performs processes for, and sends data and information to, another computer or processor.

A computer system typically is structured, in part, with at least one operating system program, for example, MICROSOFT WINDOWS, APPLE MACOS and IOS, GOOGLE ANDROID, Linux and/or Unix. The computer system typically includes a Basic Input/Output System (BIOS) and processor firmware. The operating system, BIOS and firmware are used by the processor to structure and control any subsystems and interfaces connected to the processor. Example processors that enable these operating systems include: the Pentium, Itanium, and Xeon processors from INTEL; the Opteron and Athlon processors from AMD (ADVANCED MICRO DEVICES); the Graviton processor from AMAZON; the POWER processor from IBM; the SPARC processor from ORACLE; and the ARM processor from ARM Holdings.

Any embodiment of the present disclosure is limited neither to an electronic digital logic computer structured with programs nor to an electronically programmable device. For example, the claimed embodiments can use an optical computer, a quantum computer, an analog computer, or the like. Further, where only a single computer system or a single machine is signified, the use of a singular form of such terms also can signify any structure of computer systems or machines that individually or jointly use processes. Due to the ever-changing nature of computers and networks, the description of computer system 1010 depicted in FIG. 10A is intended only as an example. Many other structures of computer system 1010 have more components than the computer system depicted in FIG. 10A.

Network interface subsystem 1016 provides an interface to outside networks, including an interface to communication network 1018, and is coupled via communication network 1018 to corresponding interface devices in other computer systems or machines. Communication network 1018 can comprise many interconnected computer systems, machines and physical communication connections (signified by 'links'). These communication links can be wireline links, optical links, wireless links (e.g., using the WiFi or Bluetooth protocols), or any other physical devices for communication of information. Communication network 1018 can be any suitable computer network, for example a wide area network such as the Internet, and/or a local-to-wide area network such as Ethernet. The communication network is wired and/or wireless, and many communication networks use encryption and decryption processes, such as is available with a virtual private network. The communication network uses one or more communications interfaces, which receive data from, and transmit data to, other systems. Embodiments of communications interfaces typically include an Ethernet card, a modem (e.g., telephone, satellite, cable, or Integrated Services Digital Network (ISDN)), (asynchronous) digital subscriber line (DSL) unit, Firewire interface, universal serial bus (USB) interface, and the like. Communication algorithms ('protocols') can be specified using one or communication languages, such as Hypertext Transfer Protocol (HTTP), Transmission Control Protocol/Internet Protocol (TCP/IP), Real-time Transport Protocol/Real Time Streaming Protocol (RTP/RTSP), Internetwork Packet Exchange (IPX) protocol and/or User Datagram Protocol (UDP).

User interface input devices 1022 can include an alphanumeric keyboard, a keypad, pointing devices such as a mouse, trackball, toggle switch, touchpad, stylus, a graphics tablet, an optical scanner such as a bar code reader, touchscreen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term 'input device' signifies all possible types of devices and processes to transfer data and information into computer system 1010 or onto communication network 1018. User interface input devices typically enable a user to select objects, icons, text and the like that appear on some types of user interface output devices, for example, a display subsystem.

User interface output devices 1020 can include a display subsystem, a printer, a fax machine, or a non-visual communication device such as audio and haptic devices. The display subsystem can include a CRT, a flat-panel device such as an LCD, an image projection device, or some other device for creating visible stimuli such as a virtual reality system. The display subsystem can also provide non-visual stimuli such as via audio output, aroma generation, or tactile/haptic output (e.g., vibrations and forces) devices. Typically, the term 'output device' signifies all possible types of devices and processes to transfer data and information out of computer system 1010 to the user or to another machine or computer system. Such devices are connected by wire or wirelessly to a computer system. Note that some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits that use any of the above input or output devices.

Memory subsystem 1026 typically includes several memories including a main RAM 1030 (or other volatile storage device) for storage of instructions and data during program execution and a ROM 1032 in which fixed instructions are stored. File storage subsystem 1028 provides persistent storage for program and data files, and can include a hard disk drive, a floppy disk drive along with associated removable media, a CD-ROM drive, an optical drive, a flash memory such as a USB drive, or removable media cartridges. If computer system 1010 includes an input device that performs optical character recognition, then text and symbols printed on a physical object (such as paper) can be used as a device for storage of program and data files. The databases and modules used by some embodiments can be stored by file storage subsystem 1028.

Bus subsystem 1012 provides a device for transmitting data and information between the various components and subsystems of computer system 1010. Although bus subsystem 1012 is depicted as a single bus, alternative embodiments of the bus subsystem can use multiple buses. For example, a main memory using RAM can communicate directly with file storage systems using DMA systems.

Figure 10B:
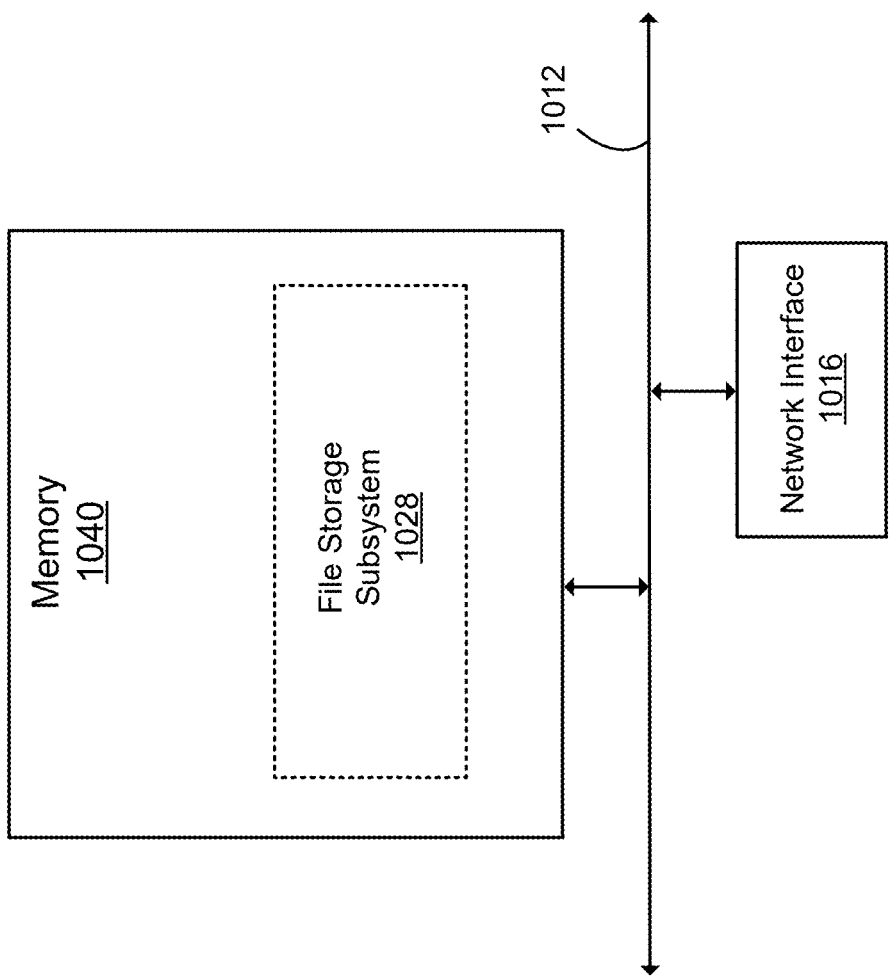
FIG. 10B is another abstract diagram of an example computer system suitable for enabling embodiments of the claimed disclosures for use in commerce, in accordance with some embodiments.

FIG. 10B is another abstract diagram of a computer system suitable for enabling embodiments of the claimed disclosures, in accordance with some embodiments. FIG. 10B depicts a memory 1040 such as a non-transitory, processor readable data and information storage medium associated with file storage subsystem 1028, and/or with network interface subsystem 1016 (e.g., via bus subsystem 1012), and can include a data structure specifying a circuit design. The memory 1040 can be a hard disk, a floppy disk, a CD-ROM, an optical medium, removable media cartridge, or any other medium that stores computer readable data in a volatile or non-volatile form, such as text and symbols on a physical object (such as paper) that can be processed by an optical character recognition system. A program transferred into and out of a processor from such a memory can be transformed into a physical signal that is propagated through a medium (such as a network, connector, wire, or circuit trace as an electrical pulse); or through a medium such as space or an atmosphere as an acoustic signal, or as electromagnetic radiation with wavelengths in the electromagnetic spectrum longer than infrared light).

Additional Example Computing System

Figure 11:
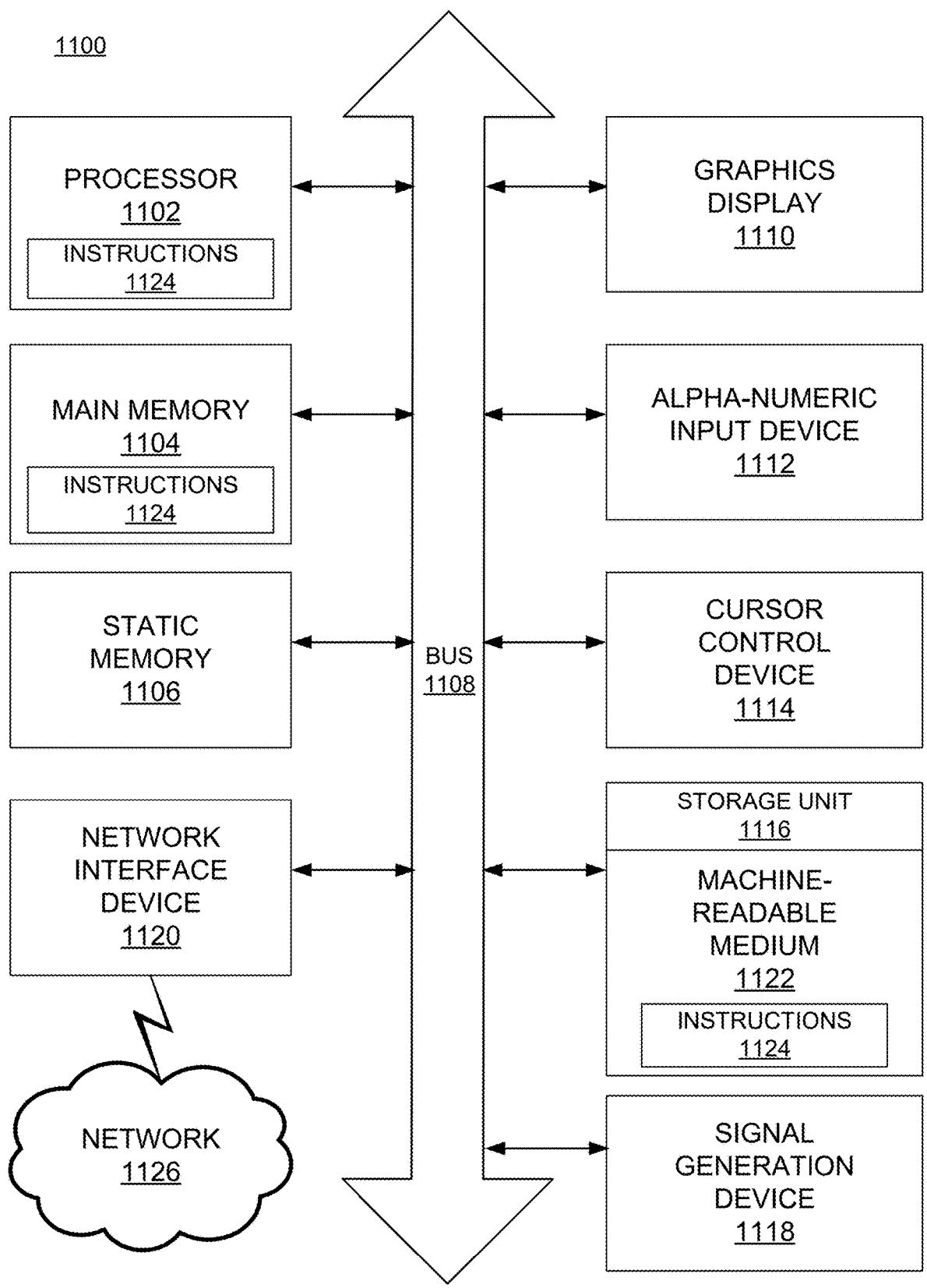
FIG. 11 illustrates an additional example computing machine for use in commerce, in accordance with some embodiments.

FIG. 11 is a block diagram illustrating components of an example computing machine that is capable of reading instructions from a computer-readable medium and execute them in a processor (or controller) according to an embodiment. A computer described herein may include a single computing machine shown in FIG. 11, a virtual machine, a distributed computing system that includes multiple nodes of computing machines shown in FIG. 11, or any other suitable arrangement of computing devices. The computer described herein may be used by any of the elements described in the previous figures to execute the described functions.

By way of example, FIG. 11 depicts a diagrammatic representation of a computing machine in the example form of a computer system 1100 within which instructions 1124 (e.g., software, program code, or machine code), which may be stored in a computer-readable medium, causing the machine to perform any one or more of the processes discussed herein. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 11 may correspond to any software, hardware, or combined components shown in the figures above. By way of example, a computing machine may be a tensor streaming processor designed and manufactured by GROQ, INC. of Mountain View, California, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1124 that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes one or more processors (generally, a processor 1102) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include graphics display unit 1110 (e.g., a plasma display panel (PDP), a liquid crystal display (LCD), a projector, or a cathode ray tube (CRT)). The computer system 1100 may also include alphanumeric input device 1112 (e.g., a keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a computer-readable medium 1122 on which the instructions 1124 are stored embodying any one or more of the methodologies or functions described herein. The instructions 1124 may also reside, completely or at least partially, within the main memory 1104 or within the processor 1102 (e.g., within a processor's cache memory). Thus, during execution thereof by the computer system 1100, the main memory 1104 and the processor 1102 may also constitute computer-readable media. The instructions 1124 may be transmitted or received over a network 1126 via the network interface device 1120.

While the computer-readable medium 1122 is shown in an example embodiment to be a single medium, the term "computer-readable medium" should be taken to include a single medium or multiple media (e.g., a centralized or distributed database, or associated caches and servers) able to store instructions (e.g., the instructions 1124). The computer-readable medium 1122 may include any medium that is capable of storing instructions (e.g., the instructions 1124) for execution by the machine and that cause the machine to perform any one or more of the methodologies disclosed herein. The computer-readable medium 1122 may include, but not be limited to, data repositories in the form of solid-state memories, optical media, and magnetic media. The computer-readable medium 1122 does not include a transitory medium such as a signal or a carrier wave.

ADDITIONAL CONSIDERATIONS

The disclosed configurations may have benefits and advantages that include, for example, a more efficient data flow by separating the functions of the processor into specialized functional units, and configuring the timing of data and instructions to each functional unit, such that each unit is able operate on received data based upon a known timing between received data and instructions. Because the compiler for the processor is hardware aware, it is able to configure an explicit plan for the processor indicating how and when instructions and data operands are transmitted to different tiles of the processor. By accounting for the timing of received instructions and data, the data can be transmitted between the tiles of the processor without unnecessary metadata, increasing the efficiency of the transmission. In addition, by separating the transmission of data and instructions, instructions can be iterated and looped independent of received data operands.

In addition, because each tile of the processor is dedicated to a specific function (e.g., MEM, VXM, MXM, SXM), the amount of instructions needed to be processed by the tiles may be reduced. For example, certain tiles (e.g., MXM) may be configured to perform a limited set of operations on any received data. As such, these tiles may be able to operate without having to receive explicit instructions or only receiving intermittent or limited instructions, potentially simplifying operation of the processor. For example, data operands read from memory can be intercepted by multiple functional slices as the data is transmitted across a data lane, allowing for multiple operations to be performed on the data in a more efficient manner.

In operation, a host computer programs a DMA engine to actually transfer data, again all of which is coordinated by the runtime layer. Specifically, the IDU transfers 320-byte vectors from PCIe-Gen4 32-bytes every core-clock cycle (e.g., nominal 900 Mhz). Thus, the 320-element vector arrives over a period of 10 cycles and placed on multiple streams moving towards the MEM. The incoming streams flow on S24-31 (upper eight streams), from which the MEM performs a "write" to commit that vector to SRAM. Hence, a PCI-Receive consists of (i) receiving the data from the PCI interface, and (ii) writing the vector into the specified functional slice of the MEM.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments of the present disclosure may further relate to a system comprising a processor (e.g., a tensor streaming processor or an artificial intelligence processor), at least one computer processor (e.g., a host server), and a non-transitory computer-readable storage medium. The storage medium can store computer executable instructions, which when executed by the compiler operating on the at least one computer processor, cause the at least one computer processor to be operable for performing the operations and techniques described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A non-transitory computer-readable storage medium comprising stored thereon computer instructions, which when executed cause a processor to:
   permute each respective block of a plurality of blocks of input data to generate a plurality of permuted blocks;
   align each permuted block of the plurality of permuted blocks to generate a plurality of aligned portions;
   merge one or more sets of aligned portions of the plurality of aligned portions to generate merged data in a first transformation domain,
   transform the merged data of the first transformation domain into intermediate data of an intermediate domain aligned with a structure of a plurality of concurrent functional units of the processor;
   concurrently perform, using the plurality of concurrent functional units of the processor, a plurality of two-dimensional pairs of pooling operations on the intermediate data to generate pooled data in the intermediate domain, each pair of pooling operations comprising a two-dimensional 1×3 max pooling operation and a two-dimensional 3×1 max pooling operation; and
   transform the pooled data of the intermediate domain into transformed data of a second transformation domain different from the first transformation domain.

2. The non-transitory computer-readable storage medium of claim 1, wherein the instructions further cause the processor to:
   initiate streaming of each respective block of input data from a memory by initiating a plurality of gather operations associated with a gather address map to concurrently load the plurality of blocks onto one or more data lanes of the processor for concurrently sending the plurality of blocks to one or more functional units of the processor.

3. The non-transitory computer-readable storage medium of claim 2, wherein permuting comprises permuting each block in accordance with a permute map defined in coordination with the gather address map.

4. The non-transitory computer-readable storage medium of claim 1, wherein the instructions further cause the processor to:
   initiate concurrent storing of each permuted block into a memory by initiating a plurality of scatter operations associated with a scatter address map.

5. The non-transitory computer-readable storage medium of claim 1, wherein the instructions further cause the processor to:
   initiate streaming of each permuted block from a memory by initiating a plurality of gather operations associated with one or more gather address maps to concurrently load the plurality of permuted blocks onto a group of data lanes of the processor for concurrently sending the plurality of permuted blocks to one or more functional units of the processor; and
   initiate, at the one or more functional units, selecting and aligning portions of each permuted block to a plurality of lanes within the group of data lanes.

6. The non-transitory computer-readable storage medium of claim 1, wherein the instructions further cause the processor to:
   initiate streaming the aligned portions of each permuted block to a vector execution module (VXM); and
   initiate performing logical OR operations at the VXM to merge different aligned portions of the permuted blocks into the merged data of the first transformation domain.

7. The non-transitory computer-readable storage medium of claim 1, wherein the first transformation domain is a 4×4 Spatial Locality Transform (SLT) domain.

8. The non-transitory computer-readable storage medium of claim 1, wherein the instructions further cause the processor to:
   initiate writing the intermediate data into a pair of hemispheres of a memory.

9. The non-transitory computer-readable storage medium of claim 1, wherein the intermediate domain is a strided format, and the second transformation domain is a sparse 2×2 Spatial Locality Transform (SLT) domain.

10. The non-transitory computer-readable storage medium of claim 1, wherein each respective block of input data comprises data indicative of a plurality of pixels, each pixel comprising at least first-channel data and second-channel data associated with distinct pixel channels, and wherein permuting comprises permuting first-channel data from each pixel of the plurality of pixels to one or more first data lanes of the processor and permuting second-channel data from each pixel of the plurality of pixels to one or more second data lanes of the processor.

11. The non-transitory computer-readable storage medium of claim 1, wherein the plurality of aligned portions comprise a grid of (N+M)×(N+M) patches of pixels, wherein M is a positive integer, and wherein aligning comprises aligning based on one or more distributor maps, each distributor map being associated with one or more of a row and column of the grid.

12. The non-transitory computer-readable storage medium of claim 11, wherein the one or more distributor maps comprise a repeating pattern of distributor maps such that a first distributor map associated with a Kth row or column is identical to a second distributor map associated with a (K+L)th row or column and identical to a third distributor map associated with a (K+2L)th row or column, wherein K and L are positive integers.

13. The non-transitory computer-readable storage medium of claim 1, wherein each spatial position of the first transformation domain is individually addressable in the intermediate domain.

14. A method, the method comprising:
  permuting, by a processor having a plurality of concurrent functional units, each respective block of a plurality of blocks of input data to generate a plurality of permuted blocks;
  aligning, by the processor having the plurality of concurrent functional units, each permuted block of the plurality of permuted blocks to generate a plurality of aligned portions;
  merging, by the processor having the plurality of concurrent functional units, one or more sets of aligned portions of the plurality of aligned portions to generate merged data in a first transformation domain;
  transforming, by the processor having the plurality of concurrent functional units, the merged data of the first transformation domain into intermediate data of an intermediate domain aligned with a structure of the plurality of concurrent functional units;
  concurrently performing, by the processor having the plurality of concurrent functional units, a plurality of two-dimensional pairs of pooling operations applied on the intermediate data to generate pooled data of the intermediate domain, each pair of pooling operations comprising a two-dimensional 1×3 max pooling operation and a two-dimensional 3×1 max pooling operation; and
  transforming, by the processor having the plurality of concurrent functional units, the pooled data of the intermediate domain into output data of a second transformation domain different from the first transformation domain.

15. The method of claim 14, further comprising:
  streaming each block of input data from a memory by performing a plurality of gather operations associated with a gather address map to concurrently load the plurality of blocks onto one or more data lanes of the processor for concurrently sending the plurality of blocks to one or more functional units of the processor;
  wherein permuting comprises performing a permute operation of each block in accordance with a permute map defined in coordination with the gather address map.

16. The method of claim 14, further comprising:
  streaming each permuted block from a memory by performing a plurality of gather operations associated with one or more gather address maps to concurrently load the plurality of permuted blocks onto one or more data lanes of the processor for concurrently sending the plurality of permuted blocks to one or more first functional units of the processor;
  performing, at the one or more first functional units of the processor, selection and alignment of portions of each permuted block to a plurality of lanes within the one or more data lanes;
  streaming the aligned portions of each permuted block to one or more second functional units comprising a vector execution module (VXM); and
  performing logical OR operations at the VXM to merge different aligned portions of the permuted blocks into the merged data of the first transformation domain.

17. The method of claim 14, wherein the first transformation domain is a 4×4 Spatial Locality Transform (SLT) domain, the intermediate domain is a strided format, and the second transformation domain is a sparse 2×2 SLT domain.

18. A computing system comprising:
  one or more processors each having a plurality of concurrent functional units; and
  one or more non-transitory computer-readable media storing instructions that are executable by one or more processors to cause the computing system to perform operations, the operations comprising:
    permuting each respective block of a plurality of blocks of input data to generate a plurality of permuted blocks;
    aligning each permuted block of the plurality of permuted blocks to generate a plurality of aligned portions;
    merging one or more sets of aligned portions of the plurality of aligned portions to generate merged data in a first transformation domain;
    transforming the merged data of the first transformation domain into intermediate data of an intermediate domain aligned with a structure of the plurality of concurrent functional units;
    concurrently performing a plurality of two-dimensional pairs of pooling operations applied on the intermediate data to generate pooled data of the intermediate domain, each pair of pooling operations comprising a two-dimensional 1×3 max pooling operation and a two-dimensional 3×1 max pooling operation; and
    transforming the pooled data of the intermediate domain into transformed data of a second transformation domain different from the first transformation domain.

19. The computing system of claim 18, wherein the operations further comprise:
  initiating streaming of each permuted block from a memory by initiating a plurality of gather operations associated with one or more gather address maps to concurrently load the plurality of permuted blocks onto a group of data lanes of the one or more processors for concurrently sending the plurality of permuted blocks to one or more first functional units of the one or more processors;
  selecting and aligning the portions of each permuted block to a plurality of data lanes within the group of data lanes;

initiating streaming the aligned portions of each permuted block to one or more second functional units of the one or more processors, the one or more second functional units comprising a vector execution module (VXM); and performing logical OR operations at the VXM to merge different aligned portions of the permuted blocks into the merged data of the first transformation domain.

20. The computing system of claim 18, wherein the intermediate data is written into a pair of hemispheres of a memory.

* * * * *